US011868082B2

(12) United States Patent
Soda et al.

(10) Patent No.: US 11,868,082 B2
(45) Date of Patent: Jan. 9, 2024

(54) IMAGE FORMING APPARATUS

(71) Applicant: CANON KABUSHIKI KAISHA, Tokyo (JP)

(72) Inventors: Takamitsu Soda, Shizuoka (JP); Kimitaka Ichinose, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/860,489

(22) Filed: Jul. 8, 2022

(65) Prior Publication Data

US 2023/0022651 A1 Jan. 26, 2023

(30) Foreign Application Priority Data

Jul. 9, 2021 (JP) ................................ 2021-114656

(51) Int. Cl.
*G03G 21/16* (2006.01)
*G03G 15/20* (2006.01)
*G03G 15/01* (2006.01)
*G03G 21/00* (2006.01)

(52) U.S. Cl.
CPC ....... *G03G 21/169* (2013.01); *G03G 15/0131* (2013.01); *G03G 15/2025* (2013.01); *G03G 21/0094* (2013.01)

(58) Field of Classification Search
CPC ............ G03G 15/161; G03G 15/1675; G03G 21/0011; G03G 15/0136; G03G 15/1615; G03G 15/5008; G03G 15/0189; G03G 2215/0132; G03G 2215/1661
See application file for complete search history.

(56) References Cited

U.S. PATENT DOCUMENTS 8,406,677 B2 3/2013 Kondo
9,690,250 B2 6/2017 Saito et al.
2007/0286636 A1 * 12/2007 Inada ................ G03G 21/0011 399/101

(Continued)

FOREIGN PATENT DOCUMENTS

JP 11-219040 A 8/1999
JP 2010-224131 A 10/2010

(Continued)

*Primary Examiner* — Jessica L Eley
(74) *Attorney, Agent, or Firm* — Venable LLP

(57) ABSTRACT

An image forming apparatus includes first and second image forming portions provided with first and second image bearing members, respectively. A controller controls a first operation in which the image to be transferred to the recording material is formed only in the first image forming portion, a second operation in which the image to be transferred is formed in the first and second image forming portions, and a supplying operation in which a lubricant is attached to the second image bearing member and supplied to a contacting portion of the second image bearing member. In a case that a stopping time exceeds a predetermined threshold when a start instruction of the first operation is input in a stopping state of the first and second image bearing members, the controller controls to execute the supplying operation during a time from when a current start instruction of the first operation is input until a next start instruction of the first or second operation is input.

15 Claims, 16 Drawing Sheets

(56) References Cited

U.S. PATENT DOCUMENTS

| | | | | |
|---|---|---|---|---|
| 2010/0054829 | A1* | 3/2010 | Iio | G03G 21/0017 399/346 |
| 2017/0060072 | A1 | 3/2017 | Hirota | |
| 2020/0019110 | A1* | 1/2020 | Matsumoto | G03G 21/0029 |
| 2020/0073297 | A1* | 3/2020 | Kamoda | G03G 21/0094 |
| 2020/0218195 | A1* | 7/2020 | Hirata | G03G 21/0094 |

FOREIGN PATENT DOCUMENTS

| | | |
|---|---|---|
| JP | 2016-143013 A | 8/2016 |
| JP | 2017-049350 A | 3/2017 |

* cited by examiner

IMAGE FORMING APPARATUS

FIELD OF THE INVENTION AND RELATED ART

The present invention relates to an image forming apparatus, such as a printer, a copier, or a fax machine of an electrophotographic type or an electrostatic recording type.

Conventionally, for example, as an image forming apparatus of the electrophotographic type, there is an image forming apparatus of a tandem system which is capable of forming color images by sequentially transferring toner images which are formed on a plurality of image bearing members onto an intermediary transfer member or onto a recording material which is borne on a recording material bearing member. As the plurality of image bearing members, four image bearing members, on which toner images of respective colors of yellow (Y), magenta (M), cyan (C), and black (K) are formed, are often used. An image forming apparatus of an intermediary transfer system, which is capable of forming toner images in the four colors described above as an example, will be mainly described below. Further, with respect to the image forming apparatus, elements for respective colors of yellow (Y), magenta (M), and cyan (C) may be described as elements for color, and an element for black (K) color may be described as an element for monochrome.

The image forming apparatus of the tandem system may be constituted to be provided with an independent driving mechanism which controls independently each of driving of an image bearing member for color and driving of an image bearing member for monochrome by providing separate motors for purposes of suppressing deterioration of the image bearing member for color, etc. That is, the image forming apparatus is constituted to be capable of performing color printing (full color printing) which is possible to form toner images on both the image bearing member for color and the image bearing member for monochrome, and monochrome printing which is possible to form a toner image only on the image bearing member for monochrome among the plurality of image bearing members. And, when printing in monochrome, it is possible to suppress deterioration of the elements for color such as the image bearing member for color by stopping driving (rotation and voltage application) of the elements for color such as the image bearing members for color.

On the other hand, as a cleaning means to remove adhered materials such as transfer residual toner on the image bearing member, a cleaning blade, which is abutted with the image bearing member and scrapes off and collects the adhered materials such as the transfer residual toner from the image bearing member as the image bearing member rotates, is widely used. In a case that a coefficient of friction between the cleaning blade and the image bearing member increases, defects such as abnormal noise (squeal) from the cleaning blade and turn-up of the cleaning blade may occur.

In order to suppress the defects described above, a constitution which performs a toner supply process as a supplying operation which will be described below is known (Japanese Laid-Open Patent Application (JP-A) Hei 11-219040). That is, a strip-shaped toner image is formed in a non-image region on the image bearing member, which is supplied to an edge portion of the cleaning blade (a portion in which the cleaning blade and the image bearing member slide against each other), and then the coefficient of friction between the cleaning blade and the image bearing member is decreased.

The increase in the coefficient of friction between the cleaning blade and the image bearing member is caused by depletion of toner on the edge portion of the cleaning blade during a period of image forming. Thus, by performing the toner supply process according to a degree of toner depletion on the edge portion of the cleaning blade during the period of image forming, it is possible to suppress the increase in the coefficient of friction between the cleaning blade and the image bearing member during the period of image formation.

By the way, the increase in the coefficient of friction between the cleaning blade and the image bearing member is also caused since a long period of time is elapsed while the image bearing member is stopped (hereinafter also referred to as "being left unused for a long time"). That is, the coefficient of friction between the cleaning blade and the image bearing member may increase due to moisture absorption of the adhered materials on the surface of the image bearing member caused by being left unused for a long time. In this case, when image formation is executed after being left unused for a long time, a load on a motor may increase, and in the worst case, this may cause defects such as step-out of a motor. Incidentally, motor step-out refers to a condition in which a motor (stepping motor) rotating in synchronization with pulses loses synchronization between an input pulse signal and motor rotation in a case of overload or sudden speed change. Thus, it is desirable to perform the toner supply process before image formation in a case of being left unused for a long time.

At this time, in a constitution which is provided with the independent driving mechanism described above, a chance in which First Print Out Time (FPOT) is extended may be increased due to the execution of the toner supply process when color printing is executed in a second and subsequent jobs after the execution of monochrome printing in a first job after being left unused for a long time. As a result, usability may be lowered. This is because the image bearing members for color are not driven in a case that monochrome printing is executed, so the toner supply process is not performed for the image bearing members for color. Incidentally, FPOT refers to a time it takes from a time when the image forming apparatus is instructed to start image formation to a time when a first recording material on which an image is formed is output. Further, the job is also defined as a series of operations to form and output images on a single or a plurality of recording materials P, which are started by a single start instruction.

SUMMARY OF THE INVENTION

In response to the above issue, it is an object of the present invention to suppress an increase in chances that FPOT may be extended by executing a supplying operation in a job after being left unused for a long time. The object described above is achieved with the image forming apparatus according to the present invention.

In summary, an image forming apparatus of the present invention includes a first image forming portion provided with a first rotatable image bearing member, a first developing member configured to supply a first developer on a surface of the first image bearing member, and a first cleaning member configured to form a first contacting portion by contacting the first image bearing member and configured to clean the surface of the first image bearing member at the first contacting portion, a second image forming portion provided with a second rotatable image bearing member, a second developing member configured to supply a second developer on a surface of the second image bearing member, and a second cleaning member configured to form a second contacting portion by contacting the second image bearing member and configured to clean the surface of the second image bearing member at the second contacting portion, a first driving source configured to drive the first image bearing member, a second driving source configured to drive the second image bearing member, a transfer device configured to transfer an image formed with the first developer in the first image forming portion and an image formed with the second developer in the second image forming portion to a recording material, a controller configured to control a first operation in which the image to be transferred to the recording material is formed only in the first image forming portion of the first and second image forming portions, a second operation in which the image to be transferred to the recording material is formed in the first image forming portion and the second image forming portion, and a supplying operation in which a lubricant is attached to the second image bearing member from the second developing member and the lubricant is supplied to the second contacting portion by rotation of the second image bearing member, and an acquiring portion configured to acquire information on time when the first image bearing member and the second image bearing member stop after the first operation or the second operation is terminated and until a next start instruction of the first operation or the second operation is input to the controller, wherein in a case that the time indicated by an acquired result of the acquiring portion exceeds a predetermined threshold when the start instruction of the first operation is input in a stopping state of the first image bearing member and the second image bearing member, the controller controls to execute the supplying operation during from the current start instruction of the first operation is input until the next start instruction of the first operation or the second operation is input.

Further features of the present invention will become apparent from the following description of exemplary embodiments with reference to the attached drawings.

DESCRIPTION OF THE EMBODIMENTS

In the following, the image forming apparatus according to the present invention will be more specifically described in accordance with drawings.

<Constitution and Operation of the Image Forming Apparatus>

Figure 1:
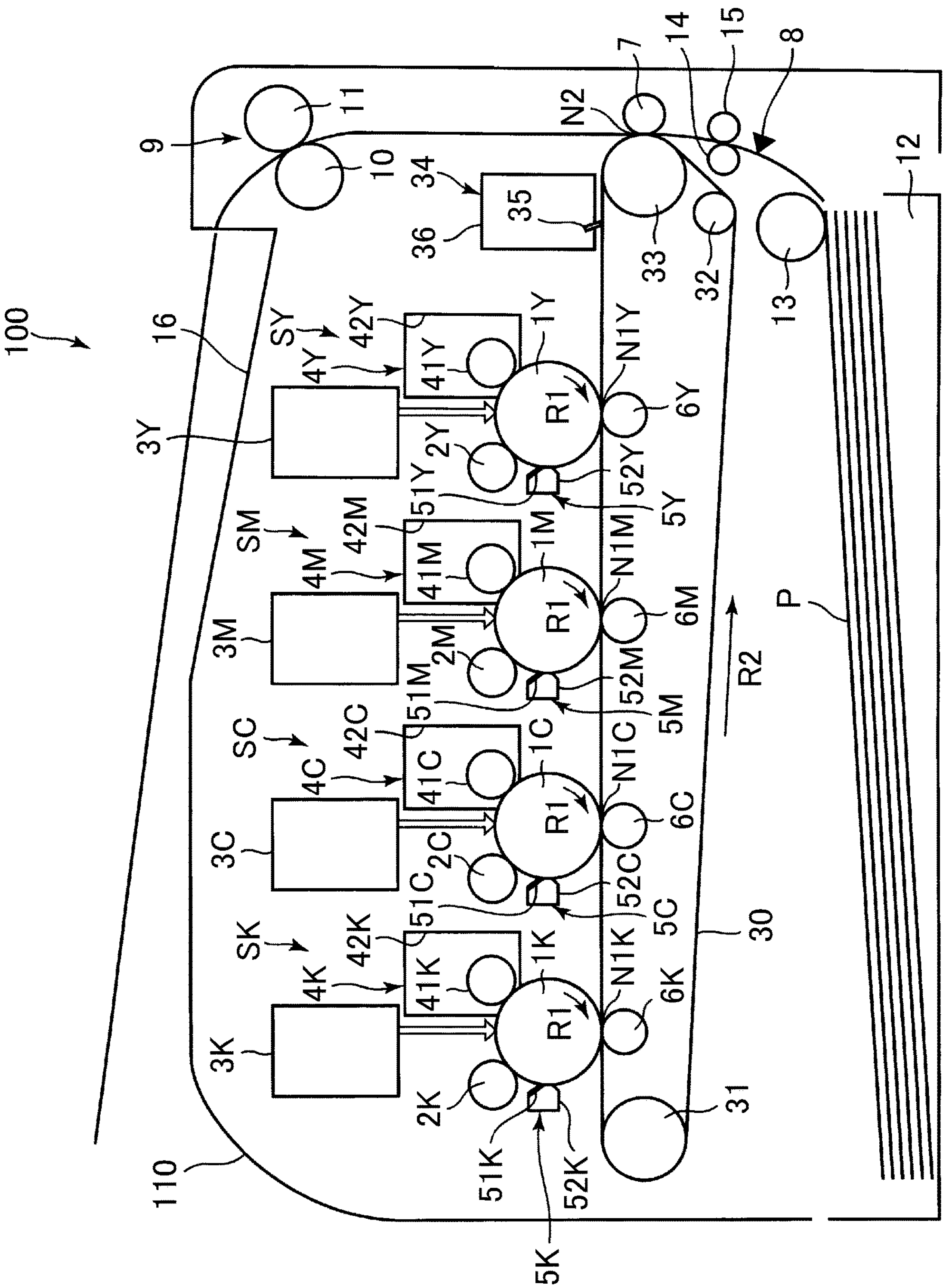
FIG. 1 is a schematic sectional view of an image forming apparatus.

FIG. 1 is a schematic sectional view of the image forming apparatus 100 according to the embodiment. The image forming apparatus 100 according to the embodiment is a color laser printer which is capable of forming full color images by using an electrophotographic type system and employs a tandem system (four drum system) and an intermediary transfer member system.

The image forming apparatus 100 includes four image forming portions (stations) of SY, SM, SC, and SK, which form images of yellow (Y), magenta (M), cyan (C), and black (K), respectively. Elements which have a same or corresponding function or constitution in the image forming portions SY, SM, SC, and SK may be described comprehensively by omitting Y, M, C, and K at ends of reference numerals which indicate elements for any of the colors. Further, the elements for each of the colors of yellow (Y), magenta (M), and cyan (C) may be described as an element for color, and the element for black (K) may be described as an element for monochrome. In the embodiment, an image forming portion S is constituted to include a photosensitive drum 1 (1Y, 1M, 1C, and 1K), a charging roller 2 (2Y, 2M, 2C, and 2K), an exposure device 3 (3Y, 3M, 3C, and 3K), a developing device 4 (4Y, 4M, 4C, and 4K), a cleaning device 5 (5Y, 5M, 5C, and 5K), etc., which will be described below.

Figure 2:
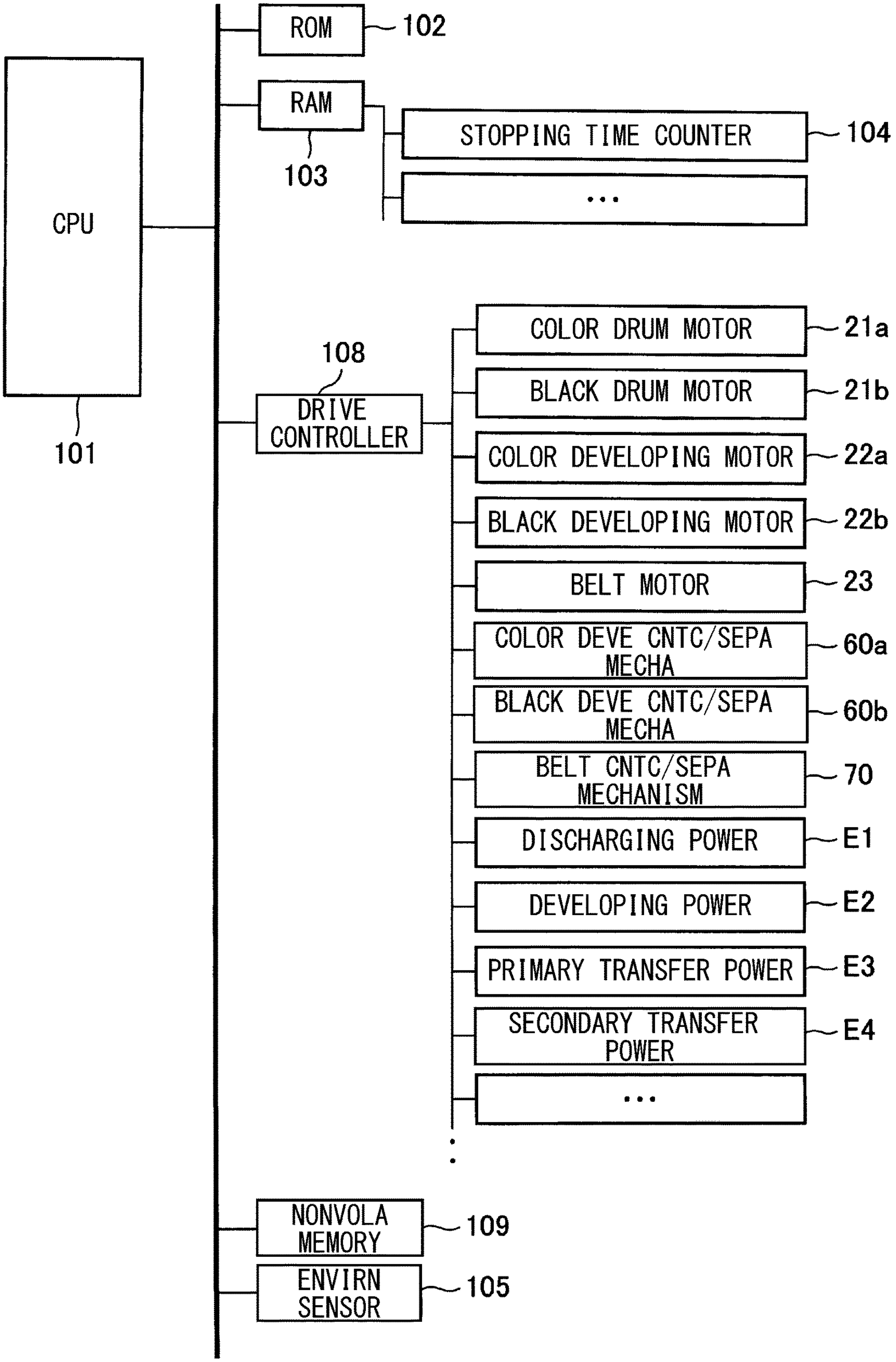
FIG. 2 is a block diagram showing a control structure of the image forming apparatus.

The photosensitive drum 1, which is a rotatable drum-type (cylindrical shape) photosensitive member (electrophotographic photosensitive member) as an image bearing member, is rotatably driven at a predetermined peripheral speed (process speed) in a direction of an arrow R1 (clockwise direction) in FIG. 1. A surface of the rotating photosensitive drum 1 is uniformly charged to a predetermined electrical potential of a predetermined polarity (negative polarity in the embodiment) by the charging roller 2 which is a roller-type charging member as a charging means. During a charging process, a charging voltage (charging bias) of −1200 V direct current voltage, for example, is applied to the charging roller 2 by a charging voltage source E1 (FIG. 2). In this way, the surface of the photosensitive drum 1 is uniformly charged to −700 V, for example. The charging roller 2 contacts the photosensitive drum 1 and is rotated by a rotation of the photosensitive drum 1. The surface of the photosensitive drum 1, which is treated to be charged, is scanned and exposed with a laser light according to image information of a color component which is corresponding to each of image forming portions S, and an electrostatic latent image (electrostatic image) is formed on the photosensitive drum 1. The exposure device 3 includes a reflecting mirror and a laser diode (light emitting element), and emits a laser light to the photosensitive drum 1. An electrical potential of an area of the surface of photosensitive drum 1 which is exposed to a laser light by the exposure device 3 is, for example, −100 V.

The electrostatic latent image which is formed on the photosensitive drum 1 is developed (visualized) when toner as developer is supplied from the developing device 4 as a developing means, and a toner image (toner image, developer image) is formed on the photosensitive drum 1. The developing device 4 includes a developer container 42 and a developing roller 41 as a developing member (developer carrying member) which is provided in the developer container 42. The developing device 4 is constituted such that the developing roller 41 is able to contact and separate from the photosensitive drum 1. During a developing process, the developing roller 41 is in a state of contacting the photosensitive drum 1. Further, during the developing process, the developing roller 41 is rotationally driven at a predetermined peripheral speed in a direction in which a direction of movement of the surface of the photosensitive drum 1 and a direction of movement of a surface of the developing roller 41 are in a forward direction at a contact portion with the photosensitive drum 1. Further, during the developing process, a developing voltage (developing bias), which is, for example, −350 V direct current voltage, is applied to the developing roller 41 by a developing voltage source E2 (FIG. 2). As a result, negative polarity toner, which is carried on the developing roller 41, moves onto the photosensitive drum 1 according to the electrostatic latent image and adheres to the photosensitive drum 1. In this way, in the embodiment, toner, which is charged with a same polarity (negative polarity in the embodiment) as a charging polarity of the photosensitive drum 1, is adhered to an exposed portion (image portion) on the photosensitive drum 1 in which an absolute value of an electrical potential is decreased due to exposure after being uniformly charged (reversal development). In the embodiment, a normal charging polarity of toner, which is a charging polarity of toner during development, is negative.

An intermediary transfer belt 30, which is constituted of an endless belt as an intermediary transfer member, is arranged so as to oppose the four photosensitive drums 1. Intermediary transfer belt 30 is stretched by a driving roller 31, a pre-transfer roller 32, a secondary transfer opposing roller 33, etc., as a plurality of stretching rollers (supporting rollers). In the embodiment, the driving roller 31 also serves as a tension roller which applies predetermined tension to the intermediary transfer belt 30. The intermediary transfer belt 30 rotates (circulating movement) at a substantially same peripheral speed (process speed) as a peripheral speed of the photosensitive drum 1 in a direction of an arrow R2 in FIG. 2 (counterclockwise direction), when the driving roller 31 is rotationally driven. On an inner peripheral surface side of the intermediary transfer belt 30, primary transfer rollers 6Y, 6M, 6C, and 6K, which are roller-type primary transfer members as primary transfer means, are provided respectively corresponding to the photosensitive drums 1Y, 1M, 1C, and 1K. The primary transfer roller 6 urges the intermediary transfer belt 30 toward the photosensitive drum 1, and the primary transfer portion N1 (primary transfer nip portion) which is a contact portion between the photosensitive drum 1 and the intermediary transfer belt 3 is formed. The pre-transfer roller 32, the secondary transfer opposing roller 33, and each of the primary transfer rollers 6 are rotated by a rotation of the intermediary transfer belt 30. The toner image which is formed on the photosensitive drum 1 is transferred (primary transfer) onto the rotating intermediary transfer belt 30 at the primary transfer portion N1 by an action of the primary transfer roller 6. During a primary transfer process, for example, +1000 V of primary transfer voltage (primary transfer bias), which is a direct current voltage of an opposite polarity (positive polarity in the embodiment) to a normal charging polarity of toner, is applied to the primary transfer roller 6 by a primary transfer voltage source E3 (FIG. 2). For example, during forming a full-color image, toner images of the respective colors of Y, M, C, and K, which are formed on the respective photosensitive drums 1Y, 1M, 1C, and 1K, are transferred sequentially by being superimposed on the intermediary transfer belt 30. In the embodiment, the intermediary transfer belt 30 is constituted of an endless film-like member of approximately from 50 μm to 150 μm in thickness, which has a volume resistivity rate from $1\times10^7$ to $1\times10^{14}$ Ωcm. Incidentally, the volume resistivity rate described above is a value measured with a high resistance meter R2340 manufactured by ADVANTEST using a measurement probe in accordance with JIS (Japanese Industrial Standard) K6911, by applying a voltage from 50 V to 100 V in an environment in which temperature is 25° C. and relative humidity is 50%.

On an outer peripheral surface side of the intermediary transfer belt 30, at a position opposing the secondary transfer opposing roller 33, a secondary transfer roller 7, which is a roller-type secondary transfer member as a secondary transfer means, is arranged. The secondary transfer roller 7 is urged toward the secondary transfer opposing roller 33, and is abutted (contacted) with the secondary transfer opposing roller 33 via the intermediary transfer belt 30, and a secondary transfer portion (secondary transfer nip portion) N2, which is a contact portion between the intermediary transfer belt 30 and the secondary transfer roller 7, is formed. The secondary transfer roller 7 is rotated by the rotation of the intermediary transfer belt 30. The toner image which is formed on the intermediary transfer belt 30 is transferred (secondary transfer) onto the recording material P which is nipped and fed between the intermediary transfer belt 30 and the secondary transfer roller 7, at the secondary transfer portion N2 by an action of the secondary transfer roller 7. During a secondary transfer process, a secondary transfer roller power supply E4 (FIG. 2) applies to the secondary transfer roller 7 a secondary transfer voltage (positive polarity in this embodiment), which is a direct current voltage opposite to the normal charging polarity of the toner (positive bias). During the secondary transfer process, a secondary transfer voltage (secondary transfer bias), which is a direct current voltage of an opposite polarity (positive polarity in the embodiment) to a normal charging polarity of toner, is applied to the secondary transfer roller 7 by a secondary transfer voltage source E4 (FIG. 2). Recording material (transferred material, recording medium, sheet) P, such as recording paper and plastic sheet, is accommodated in a recording material accommodating portion (cassette) 12. When an operation of a job starts, the recording material P is separated and fed one by one from the recording material accommodating portion 12 by a pickup roller 13, etc. as a feeding member. Feeding of the recording material P, which is fed from the recording material accommodating portion 12, is temporarily stopped at a position where a leading end of the recording material P is slightly passed through a feeding roller pair (registration roller pair) 14 and 15, after a position of the leading end of the recording material P is detected by a registration sensor 8. The recording material P is fed to the secondary transfer portion N2 when feeding of the recording material P is restarted so that its timing is synchronized with the toner image on the intermediary transfer belt 30 at the secondary transfer portion N2. And the toner image is transferred from the intermediary transfer belt 30 onto the recording material P at the secondary transfer portion N2.

The recording material P on which the toner image is transferred is fed to the fixing device 9 as a fixing means. The fixing device 9 fixes (melt and fix) the toner image on the recording material P by heating and pressurizing the recording material P which bears an unfixed toner image by a fixing roller pair 10 and 11. After that, the recording material P on which the toner image is fixed is discharged to a discharging tray 16 which is provided outside (outside of the apparatus) of the main assembly 110 of the image forming apparatus 100.

Figure 5:
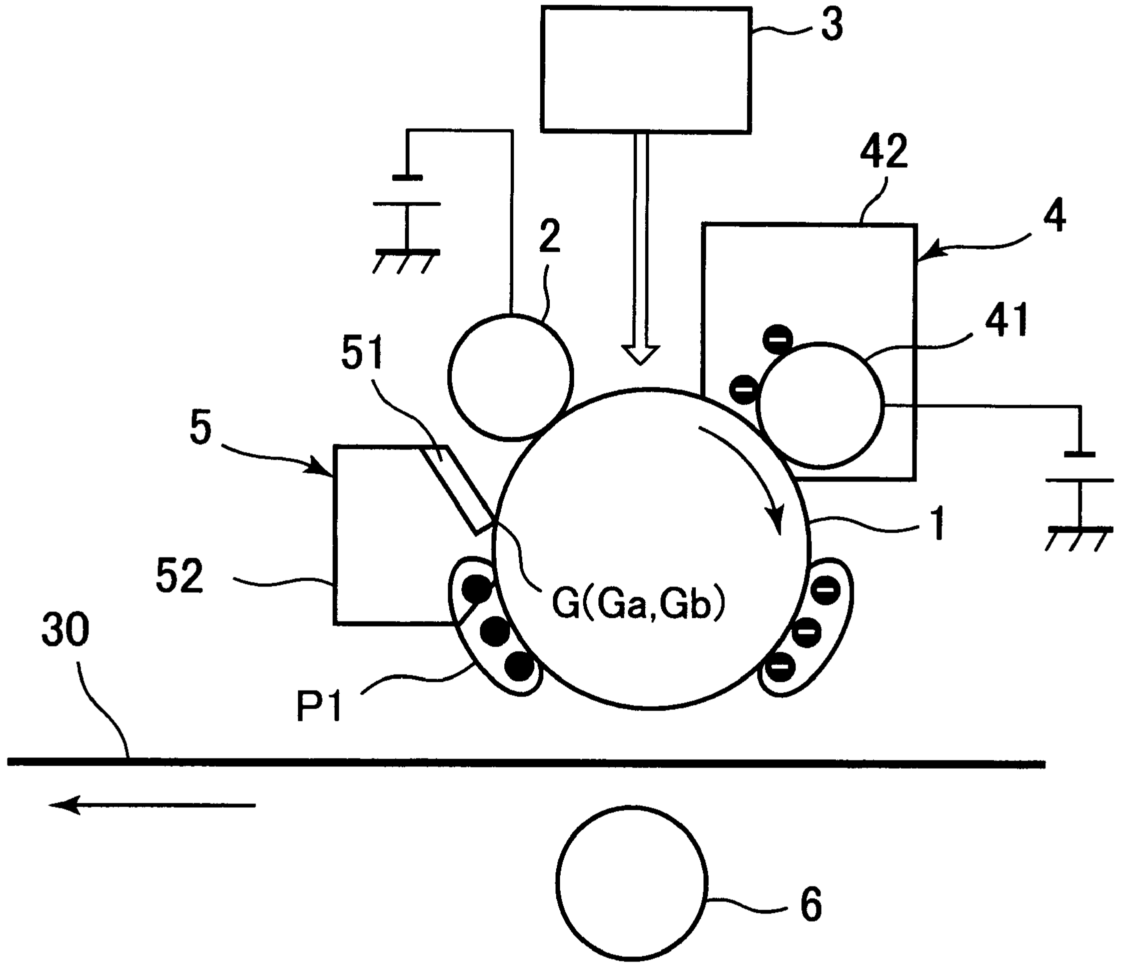
FIG. 5 is a schematic view illustrating a toner supply process.

On the other hand, the adhered material such as the toner (transfer residual toner) which remains on the photosensitive drum 1 without being transferred onto the intermediary transfer belt 30 during the primary transfer process is removed and collected from the photosensitive drum 1 by the cleaning device 5 as a sweeping means (cleaning means). The cleaning device 5 includes a cleaning blade 51 as a sweeping member (cleaning member) and a cleaning container 52. The cleaning blade 51 is a plate-shaped (blade-shaped) elastic member which is formed of urethane rubber as an elastic material, etc. The cleaning blade 51 contacts the surface of the photosensitive drum 1 with a predetermined pressure and in a direction which is a counter direction with respect to a direction of movement of the surface of the photosensitive drum 1 and forms a contact portion (cleaning portion) G (FIG. 5) between the photosensitive drum 1 and the cleaning blade 51. In more detail, the cleaning blade 51 is arranged so that its longitudinal direction is substantially parallel to a direction of a rotational axis of the photosensitive drum 1, and is arranged so that a free end portion, which is one end portion in its lateral direction, is positioned at a more upstream side than a fixed end portion, which is the other end portion with respect to the direction of movement of the surface of the photosensitive drum 1. And the cleaning blade 51 is arranged so that an edge portion on the photosensitive drum 1 side of edge portions extending in the longitudinal direction described above, which form an end surface of the free end portion described above, contacts the surface of the photosensitive drum 1. The fixed end portion of the cleaning blade 51 is fixed to a supporting member (not shown), and the supporting member is fixed to the cleaning container 52. In the cleaning device 5, the adhered material such as the transfer residual toner is scraped off from the rotating photosensitive drum 1 by the cleaning blade 51, and is accommodated in the cleaning container 52. Incidentally, the cleaning portions described above in the color image forming portion SY, the color image forming portion SM, and the color image forming portion SC are referred to as color cleaning portions Ga, and the cleaning portion described above in the black image forming portion SK is referred to as a black cleaning portion Gb (FIG. 5).

Further, the adhered material such as the toner (transfer residual toner) which remains on the intermediary transfer belt 30 without being transferred onto the recording material P during the secondary transfer process is removed and collected from the intermediary transfer belt 30 by a belt cleaning device 34 as an intermediary transfer member sweeping means. The belt cleaning device 34 includes a belt cleaning blade 35 as a belt sweeping member, and a belt cleaning container 36. In the belt cleaning device 34, the adhered material such as the transfer residual toner is scraped off from the rotating intermediary transfer belt 30 by the belt cleaning blade 35, and is accommodated in the cleaning container 52.

In the embodiment, in each image forming portion S, the photosensitive drum 1, and the charging roller 2, the developing device 4, and the cleaning device 5 as a process means which act on the photosensitive drum 1 integrally constitute a process cartridge which is dismountable from the main assembly 110 of the image forming apparatus 100.

Incidentally, in the embodiment, the image forming apparatus 100 includes a color drum motor 21*a* as a driving source of the color photosensitive drum 1Y, the color photosensitive drum 1M, and the color photosensitive drum 1C, and a black drum motor 21*b* as a driving source of the black photosensitive drum 1K (FIG. 2). Further, in the embodiment, the image forming apparatus 100 includes a color developing motor 22*a* as a driving source of a color developing roller 41Y, a color developing roller 41M, and a color developing roller 41C, and a black developing motor 22*b* as a driving source of the black developing roller 41K (FIG. 2). In this way, it is possible to control the driving of the photosensitive drum 1 and the driving of the developing roller 41 independently in the color image forming portion SY, the color image forming portion SM and the color image forming portion SM, and the black image forming portion SK. Further, in the embodiment, the image forming apparatus 100 includes a belt motor 23 as a driving source of the intermediary transfer belt 30 (driving roller 31).

Further, in the embodiment, the image forming apparatus 100 is able to execute color printing (full color printing, full color mode) and monochrome printing (black monochrome printing, monochrome mode) as a printing mode (image forming mode). Color printing is a printing mode that it is possible to form the toner image on both the color photosensitive drum 1Y, the color photosensitive drum 1M and the color photosensitive drum 1C, and the black photosensitive drum 1K. Further, monochrome printing is a printing mode that it is possible to form the toner image only on the black photosensitive drum 1K among a plurality of photosensitive drums 1. During color printing, following operations are executed in both the color image forming portion SY, the color image forming portion SM and the color image forming portion SC, and the black image forming portion SK. That is, rotational driving of the photosensitive drum 1 and the developing roller 41, the charging process of the photosensitive drum 1, abutting (contacting) the photosensitive drum 1 with the developing roller 41, and abutting the photosensitive drum 1 with the intermediary transfer belt 30, are executed. During monochrome printing, only in the black image forming portion SK among a plurality of image forming portions S, rotational driving of the photosensitive drum 1 and the developing roller 41, the charging process of the photosensitive drum 1, abutting the photosensitive drum 1 with the developing roller 41, and abutting the photosensitive drum 1 with the intermediary transfer belt 30, are executed.

Figure 16:
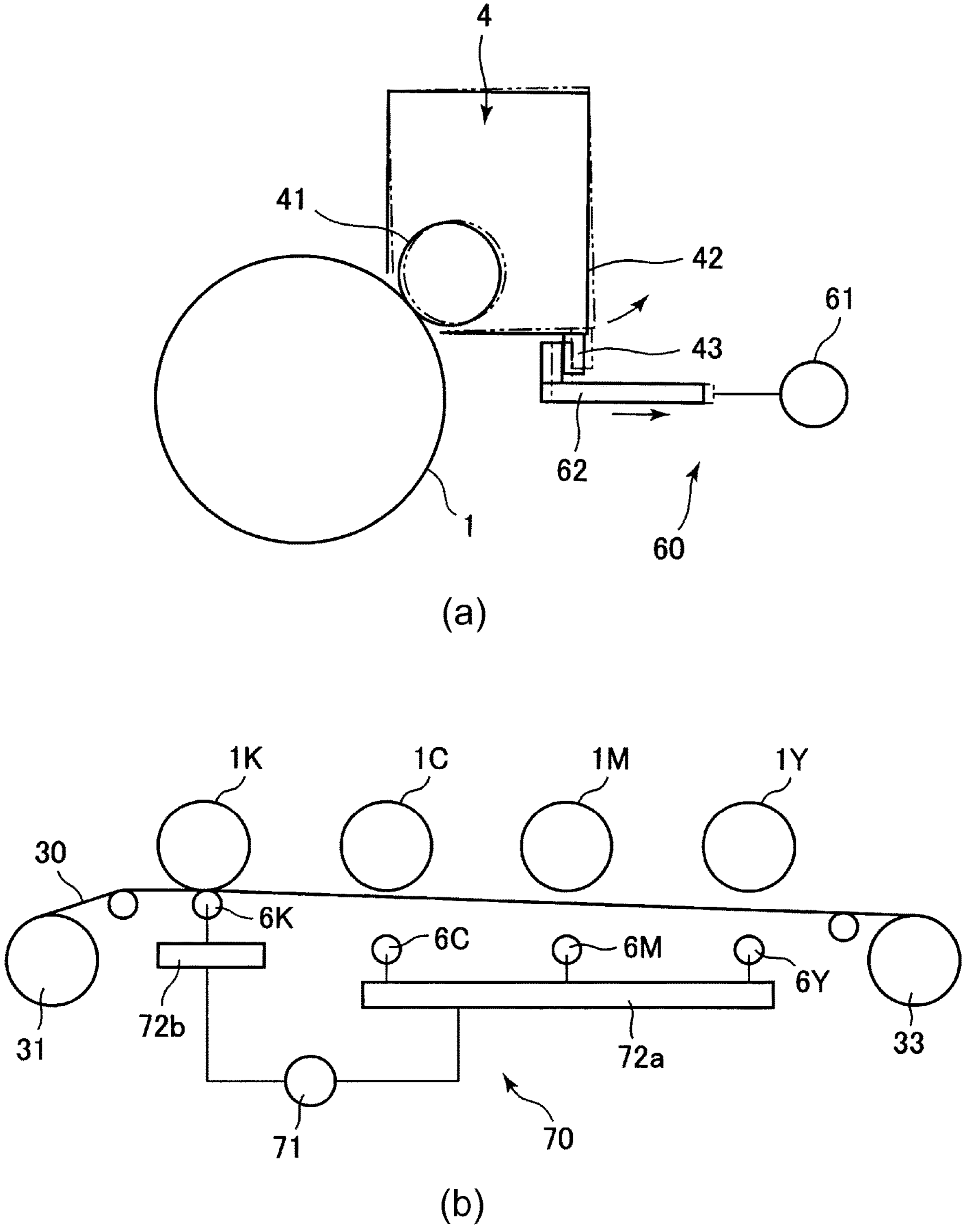
FIG. 16, part (a) and part (b), is a schematic view illustrating a developing contact/separation mechanism and a belt contact/separation mechanism.

Further, in the embodiment, the image forming apparatus 100 includes a color developing contact/separation mechanism 60*a* (FIG. 2) as a means of switching contact/separation states between the photosensitive drum 1 of the color image forming portion SY, the color image forming portion SM and the color image forming portion SC, and the developing roller 41. In the embodiment, the color developing contact/separation mechanism 60*a* switches the contact/separation states between the photosensitive drum 1 of the color image forming portion SY, the color image forming portion SM and the color image forming portion SC, and the developing roller 41, synchronously. Further, in the embodiment, the image forming apparatus 100 includes a black developing contact/separation mechanism 60*b* (FIG. 2) as a means of switching contact/separation states between the photosensitive drum 1 of the black image forming portion SK and the developing roller 41. The developing contact/separation mechanism 60 (the color developing contact/separation mechanism 60*a*, the black developing contact/separation mechanism 60*b*) are constituted as follows, respectively. As shown in part (a) of FIG. 16, the developer container 42 is rotatable (swingable) around a rotational axis which is substantially parallel to a direction of a rotational axis of the photosensitive drum 1, and is urged by an urging member such as a spring, so that the developing roller 41 rotates in a direction that the developing roller 41 is abutted with the photosensitive drum 1. Further, the developing contact/separation mechanism 60 includes a developing contact/separation motor 61, and a developing contact/separation moving member 62 which is driven by the developing contact/separation motor 61. And the developing contact/separation mechanism 60 is possible to control pressing and release of pressing of the developing contact/separation moving member 62 against a receiving portion 43 which is provided with the developer container 42 of the developing device 4. By pressing the receiving portion 43 with the developing contact/separation moving member 62, the developing roller 41 is possible to separate away from the photosensitive drum 1. Further, when pressure on the receiving portion 43 by the developing contact/separation moving member 62 is released, it is possible to abut the developing roller 41 with the photosensitive drum 1. In the embodiment, the developing contact/separation mechanism 60 practically abuts the developing roller 41 with the photosensitive drum 1 during developing. Further, when the image forming apparatus 100 is stopped (standby state as waiting for a job, or power OFF state), etc., the developing contact/separation mechanism 60 separates the developing roller 41 from the photosensitive drum 1.

Further, in the embodiment, the image forming apparatus 100 includes a belt contact/separation mechanism 70 (FIG. 2) as a means of switching contact/separation states between the photosensitive drum 1 and the intermediary transfer belt 30. The belt contact/separation mechanism 70 is constituted as follows. In both the color image forming portion SY, the color image forming portion SM and the color image forming portion SC, and the black image forming portion SK, the primary transfer roller 6 is movable in both directions approaching and leaving the photosensitive drum 1. As shown in part (b) of FIG. 16, the belt contact/separation mechanism 70 includes a belt contact motor 71, and a color moving member 72*a* and a black moving member 72*b* which are driven by the belt contact/separation motor 71. The color moving member 72*a* moves the primary transfer rollers 6Y, 6M and 6C, and the black moving member 72*b* moves the primary transfer roller 6K. And the belt contact/separation mechanism 70 is possible to control a movement of the color primary transfer rollers 6Y, 6M and 6C by the color moving member 72*a* and a movement of the black primary transfer roller 6K by the black moving member 72*b*. It is possible to separate the intermediary transfer belt 30 from the photosensitive drum 1 by moving (retracting) the primary transfer roller 6 in a direction of leaving from the photosensitive drum 1 with the belt contact/separation mechanism 70. Further, it is possible to abut the intermediary transfer belt 30 with the photosensitive drum 1, by moving the primary transfer roller 6 in a direction of approaching to the photosensitive drum 1 with the belt contact/separation mechanism 70. In the embodiment, the belt contact/separation mechanism 70 is possible to sequentially switch the contact/separation states between the color image forming portion SY, the color image forming portion SM and the color image forming portion SC, and the intermediary transfer belt 30, to "all separating state", "single contacting state" and "all contacting state" as follow. "All separating state" is a state (not shown) in which the intermediary transfer belt 30 is separated from the photosensitive drum 1 in all of the color image forming portion SY, the color image forming portion SM and the color image forming portion SC, and the black image forming portion SK. "Single contacting state" is a state in which the intermediary transfer belt 30 is in contact with the photosensitive drum 1 only in the black image forming portion SK of the plurality of image forming portions S (part (b) of FIG. 16). "All contacting state" is a state in which the intermediary transfer belt 30 is in contact with the photosensitive drum 1 in all of the color image forming portion SY, the color image forming portion SM and the color image forming portion SC, and the black image forming portion SK (FIG. 1). In the embodiment, for example, a state when the image forming apparatus 100 is stopped (standby state as waiting for a job, or power OFF state), etc., is "all separate state" described above. Further, a state during monochrome printing is "single contacting state" described above. Further, a state during color printing is "all contacting state" described above.

<Control Constitution of the Image Forming Apparatus>

FIG. 2 is a block diagram schematically showing a control constitution of the image forming apparatus 100 in the embodiment. A CPU 101 as a control portion controls each portion of the image forming apparatus 100, by using a RAM 103 as a memory portion for a work area, based on various control programs which are accommodated in a ROM 102 as a memory portion. The various control programs, various data, and tables are accommodated in the ROM 102. A program load area, a work area of the CPU 101, an accommodating area of various data are secured in the RAM 103 and a drum motor stop time counting portion 104 as a counting means described below is also included.

Further, a driving control portion 108 is connected to the CPU 101. In the embodiment, a color drum motor 21*a*, a black drum motor 21*b*, a color developing motor 22*a*, a black developing motor 22*b*, etc. are connected to the driving control portion 108. Further, the charging voltage source E1, the developing voltage source E2, the primary transfer voltage source E3, the secondary transfer roller power supply E4, the belt motor (stepping motor) 23, the color developing contact/separation mechanism 60*a*, the black developing contact/separation mechanism 60*b*, the belt contact/separation mechanism 70, etc. are connected to the driving control portion 108. Although omitted in FIG. 2, in the embodiment, the charging voltage source E1, the developing voltage source E2, and the primary transfer voltage source E3 are mounted independently for each of the image forming portions S. For example, the driving control portion 108 controls operation of motors for driving various driven members, application of various voltages, exposure by the exposure device 3, etc., according to instructions from the CPU 101. The various driven members described above are the photosensitive drum 1, the developing roller 41, the intermediary transfer belt 30, etc. Further, the various voltages described above are the charging voltage, the developing voltage, the primary transfer voltage, the secondary transfer voltage, etc. Incidentally, as described above, in the embodiment, separate drum motors (stepping motors) 21

(the color drum motor 21*a*, the black drum motor 21*b*) are provided for driving of the color photosensitive drum 1Y, the color photosensitive drum 1M and the color photosensitive drum 1C, and driving of the black photosensitive drum 1K. Further, in the embodiment, separate developing motors (stepping motors) 22 are provided for driving of the color developing roller 41Y, the color developing roller 41M, and the color developing roller 41C, and for driving of the black developing roller 41K. Further, in the embodiment, separate developing contact/separation motors (stepping motors) 61 (part (a) of FIG. 16) are provided for driving of a color developing contact/separation mechanism 60*a* and driving of a black developing contact/separation mechanism 60*b*.

Further, a nonvolatile memory 109 which is a memory portion, is connected to the CPU 101. The nonvolatile memory 109 is a storage device which stores various data. Incidentally, an environmental sensor 105, which is described in an embodiment 2, is also shown in FIG. 2, for convenience.

Here, the image forming apparatus 100 executes a job (printing, printing out or print job), which is a series of operations to form an image and output on a single or a plurality of recording materials P, initiated by a single start instruction. In general, the job includes an image forming process, a pre rotation process, a sheet interval process in case that images are formed on the plurality of recording materials P, and a post rotation process. The image forming process is a period for forming an electrostatic latent image of an image which is actually formed and output on the recording material P, forming a toner image, and primary transferring and second transferring of the toner image, and a time for image forming (image forming period) refers to this period. In more detail, timings of the time for image forming differs depending on positions of each process of forming the electrostatic latent image, forming the toner image, and primary transferring and second transferring of the toner image. The pre rotation process is a period for a preparatory operation, which is prior to the image forming process, from a time when a start instruction is input, to a time when an image is actually formed. The sheet interval process (a recording material interval process, an image interval process) is a period which corresponds to a time between the recording material P and the recording material P in a case that images are formed on a plurality of recording materials P continuously (continuous image forming). The post rotation process is a period of an arrangement operation (a preparatory operation) after the image forming process. No image forming time (no image forming period) is a period other than the image forming time, and includes the pre rotation process, the sheet interval process, the post rotation process, described above, and furthermore a pre multiple rotation process which is a preparatory operation when the image forming apparatus 100 is powered on or when it returns from sleep mode.

<Color Printing and Monochrome Printing>

Figure 3:
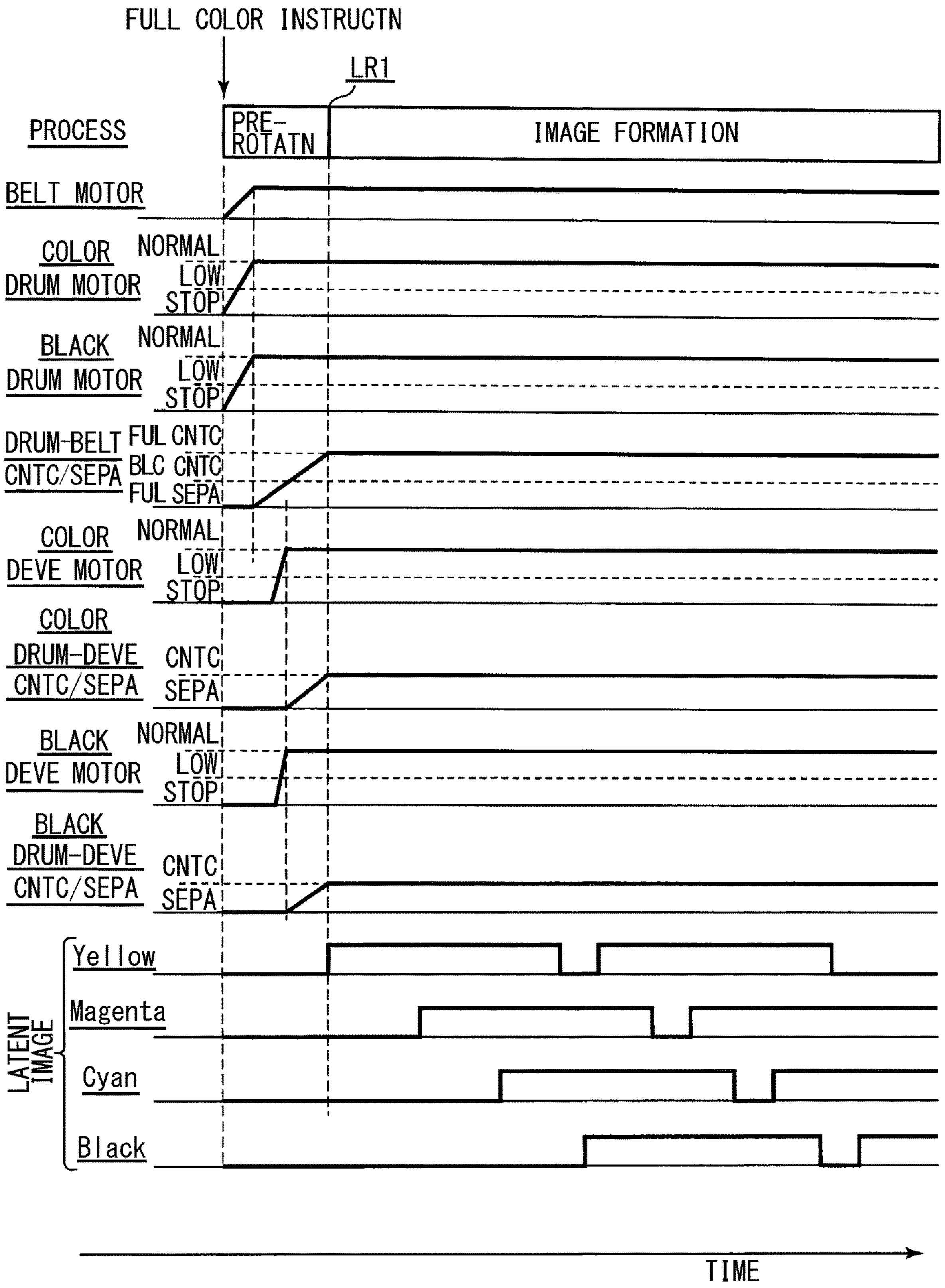
FIG. 3 is a timing chart of operations for color printing.
Figure 4:
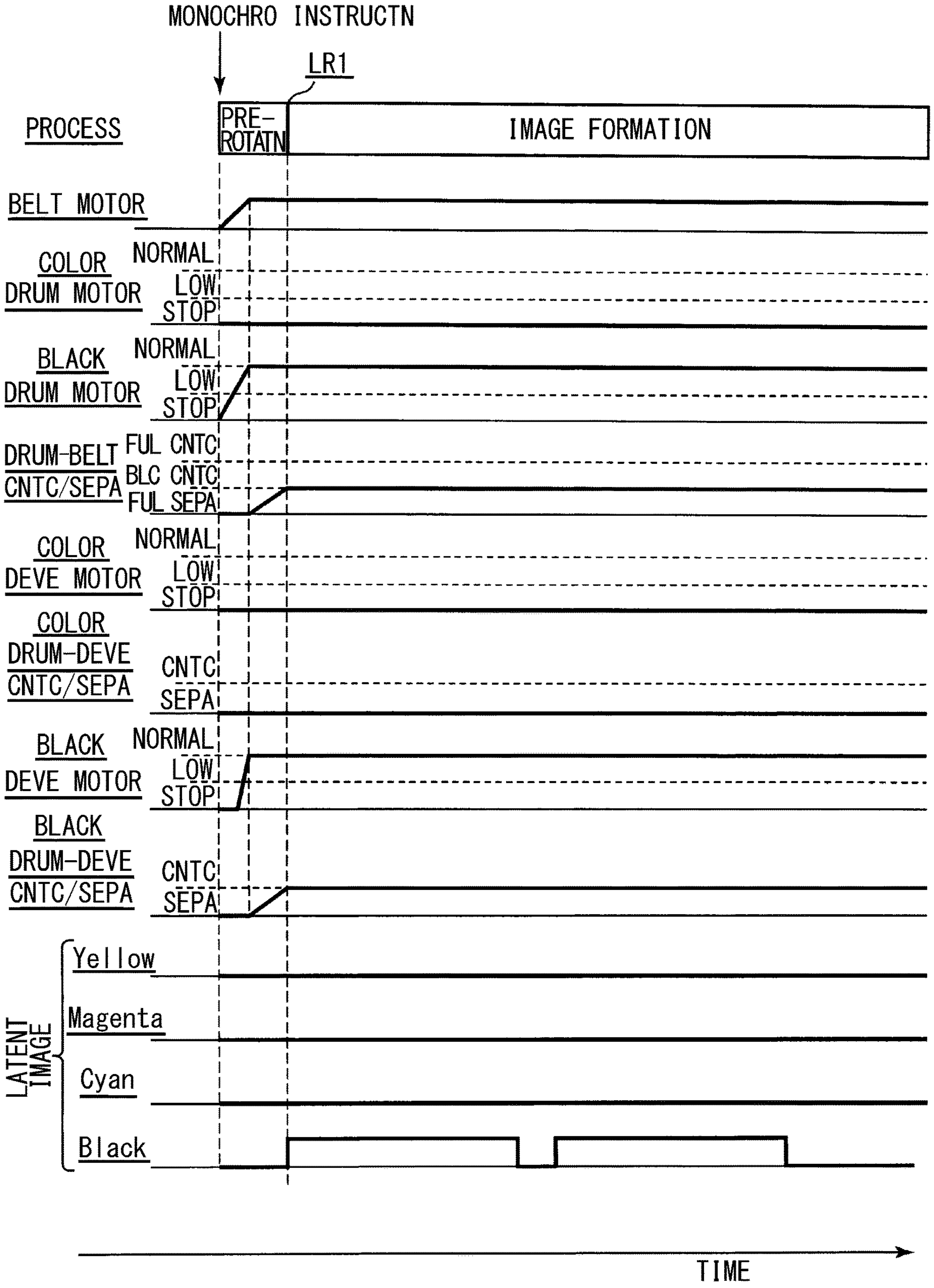
FIG. 4 is a timing chart of operations for monochrome printing.

In the embodiment, the image forming apparatus 100 is able to execute monochrome printing and color printing as a printing mode. With reference to FIG. 3 and FIG. 4, operations of each of the printing modes will be described.

First, the operation of the color printing will be described. FIG. 3 is a timing chart diagram showing a timing of a driving system operation and a timing of image (electrostatic latent image) forming in color printing. Incidentally, LR1 in FIG. 3 is showing a start timing of electrostatic latent image forming. Further, although omitted in FIG. 3 (as well as FIG. 4, FIG. 7, FIG. 8, FIG. 10, FIG. 12, FIG. 13 and FIG. 15, which will be described below), in the embodiment, the photosensitive drum 1 starts the charging process at a substantially same time as starting of rotational driving, and stops the charging process at substantially same time as stopping of rotational driving.

When the CPU 101 receives a color printing instruction from an external device (not shown) such as a personal computer which is connected to the image forming apparatus 100, the CPU 101 starts driving of the belt motor 23, the color drum motor 21*a* and the black drum motor 21*b*. And at a timing when speeds of the intermediary transfer belt 30 and each of the photosensitive drums 1Y, 1M, 1C, and 1K are all converged to a predetermined speed (normal speed), the CPU 101 starts an operation to contact each of the photosensitive drums 1Y, 1M, 1C and 1K with the intermediary transfer belt 30. In the embodiment, the predetermined speed (normal speed) of each of the photosensitive drums 1Y, 1M, 1C and 1K, and the intermediary transfer belt 30, during image forming, is 200 mm/s (peripheral speed). On the other hand, the CPU 101 also starts driving of the color developing motor 22*a* and the black developing motor 22*b* at a predetermined timing. And at a timing when speeds of each of the paired developing rollers 41Y, 41M, 41C and 41 K and each of the photosensitive drums 1Y, 1M, 1C and 1K are all converged to the predetermined speed (normal speed), the CPU 101 starts an operation to contact each of the photosensitive drums 1Y, 1M, 1C and 1K with each of the developing rollers 41Y, 41M, 41C and 41K. Further, at a timing (LR1) when contacting the intermediary transfer belt 30 with each of the photosensitive drums 1Y, 1M, 1C and 1K and contacting each of the photosensitive drums 1Y, 1M, 1C and 1K with each of the developing rollers 41Y, 41M, 41C and 41 K are completed, as a starting point, the CPU 101 starts forming electrostatic latent images for each of colors Y, M, C and K in order at predetermined intervals. After that, the electrostatic latent images are developed with each of color toners Y, M, C and K.

Next, an operation of monochrome printing will be described. FIG. 4 is a timing chart diagram showing an operation timing of a driving system and a timing of image (electrostatic latent image) forming in monochrome printing. LR1 in FIG. 4 is showing a timing when an electrostatic latent image forming is started.

When the CPU 101 receives a monochrome printing instruction from an external device, the CPU 101 starts driving of the belt motor 23 and the black drum motor 21*b*. And at a timing when speeds of the intermediary transfer belt 30 and the black photosensitive drum 1K are both converged to a predetermined speed (normal speed), the CPU 101 starts an operation to contact the black photosensitive drum 1K with the intermediary transfer belt 30. On the other hand, the CPU 101 also starts driving of the black developing motor 22*b* at a predetermined timing. And at a timing when speeds of the black developing roller 41K and the black photosensitive drums 1K are both converged to the predetermined speed (normal speed), the CPU 101 starts an operation to contact the black photosensitive drum 1K with the developing roller 41K. Further, at a timing (LR1) when contacting the intermediary transfer belt 30 with the black photosensitive drum 1K and contacting the black photosensitive drum 1K with the black developing roller 41K are completed, as a starting point, the CPU 101 starts forming electrostatic latent image for image forming of color K. After that, the electrostatic latent image is developed with black color toner K.

<Toner Supply Process>

In the embodiment, the image forming apparatus 100 performs the toner supply process as a supplying operation for an object of reducing a friction coefficient between the photosensitive drum 1 and the cleaning blade 51. FIG. 5 is a schematic diagram for illustrating the toner supply process. Incidentally, P1 in FIG. 5 shows lubricant which is supplied to the cleaning blade 51.

In the toner supply process, toner or a toner additive (such as an external additive) as lubricant is adhered to the non-image region on the photosensitive drum 1. That is, the term "toner supply process" is used for convenience, however, the lubricant which is supplied is not limited to toner. As a means of adhering toner or a toner additive, following methods are given, for example. As shown in FIG. 5, there is a method that the electrostatic latent image is formed on the photosensitive drum 1 while the developing roller 41 is contacted with the photosensitive drum 1 (forming the toner image by executing the charging process, an exposing process and the developing process). Further, there is a method that the developing roller 41 is contacted with the photosensitive drum 1 and the charging voltage and the developing voltage are adjusted to facilitate adherence of the lubricant in the developing device 4 to the photosensitive drum 1 (adhering the toner by applying at least one of the charging voltage and the developing voltage without exposing process). Further, there is a method to simply rotate the photosensitive drum 1 for a certain period of time while the developing roller 41 is contacted with the photosensitive drum 1.

In order to prevent the lubricant from being transferred to the intermediary transfer belt 30, it is possible to space the intermediary transfer belt 30 from the photosensitive drum 1 by retracting the primary transfer roller 6 from the photosensitive drum 1. In this way, it is possible to make it easier to supply the lubricant to the edge portion of the cleaning blade 51 (a contact portion between the photosensitive drum 1 and the cleaning blade 51). Incidentally, the lubricant may not be transferred to the intermediary transfer belt 30, by applying a voltage of a same polarity (for example, negative polarity) as a charging polarity of the lubricant, for example a DC voltage of −1000V, to the primary transfer roller 6, while the intermediary transfer belt 30 is contacted with the photosensitive drum 1.

In the embodiment, a predetermined toner image (supply toner image) is formed in the toner supply process by a method which executes the charging process, the exposing process and the developing process described above. Especially, in the embodiment, the supply toner image with a predetermined width in a direction of movement of the surface of the photosensitive drum 1 (sub scanning direction) is formed over a substantially entire region of an image forming region (region where it is possible to form the toner image) in a direction of a rotational axis of the photosensitive drum 1 (main scanning direction). In this embodiment, the supply toner image is constituted of a solid image (a highest density level image).

It is possible to execute the toner supply process at arbitrary timing during a non-image forming time. Especially, it is desirable to execute the toner supply process in a case that the friction coefficient between the photosensitive drum 1 and the cleaning blade 51 is assumed to be high. In this way, it is possible to suppress an abnormal noise (squeal) which is generated by sliding between the cleaning blade 51 and the photosensitive drum 1 during rotation of the photosensitive drum 1. Further, it is possible to suppress the edge portion of the cleaning blade 51 which is abutted with the photosensitive drum 1 in a counter direction to the direction of movement of the surface of the photosensitive drum 1 to turn up (turn-up) in the direction of movement of the surface of the photosensitive drum 1. Further, it is possible to suppress to occur a defective rotation of the photosensitive drum 1.

<Toner Supply Process after being Unused for a Long Time>

(Increased Load on the Drum Motor after being Unused for a Long Time)

When the photosensitive drum 1 has been stopped for a long time ("unused for a long time"), moisture absorption of the adhered material on the surface of the photosensitive drum 1 is promoted, and the friction coefficient between the photosensitive drum 1 and the cleaning blade 5 increases. As a result, the load increases when the drum motor 21 starts up after being unused for a long time. Although a degree of moisture absorption of the adhered material on the surface of the photosensitive drum 1 depends on temperature and humidity environment, etc., in a worst case, it may cause a defect such as step-out of the drum motor 21.

Therefore, in the embodiment, by executing the toner supply process after being unused for a long time, a defect such as a step-out at the startup of the drum motor 21 described above is prevented.

(Color Printing After Being Unused for a Long Time in the Embodiment)

Figure 6:
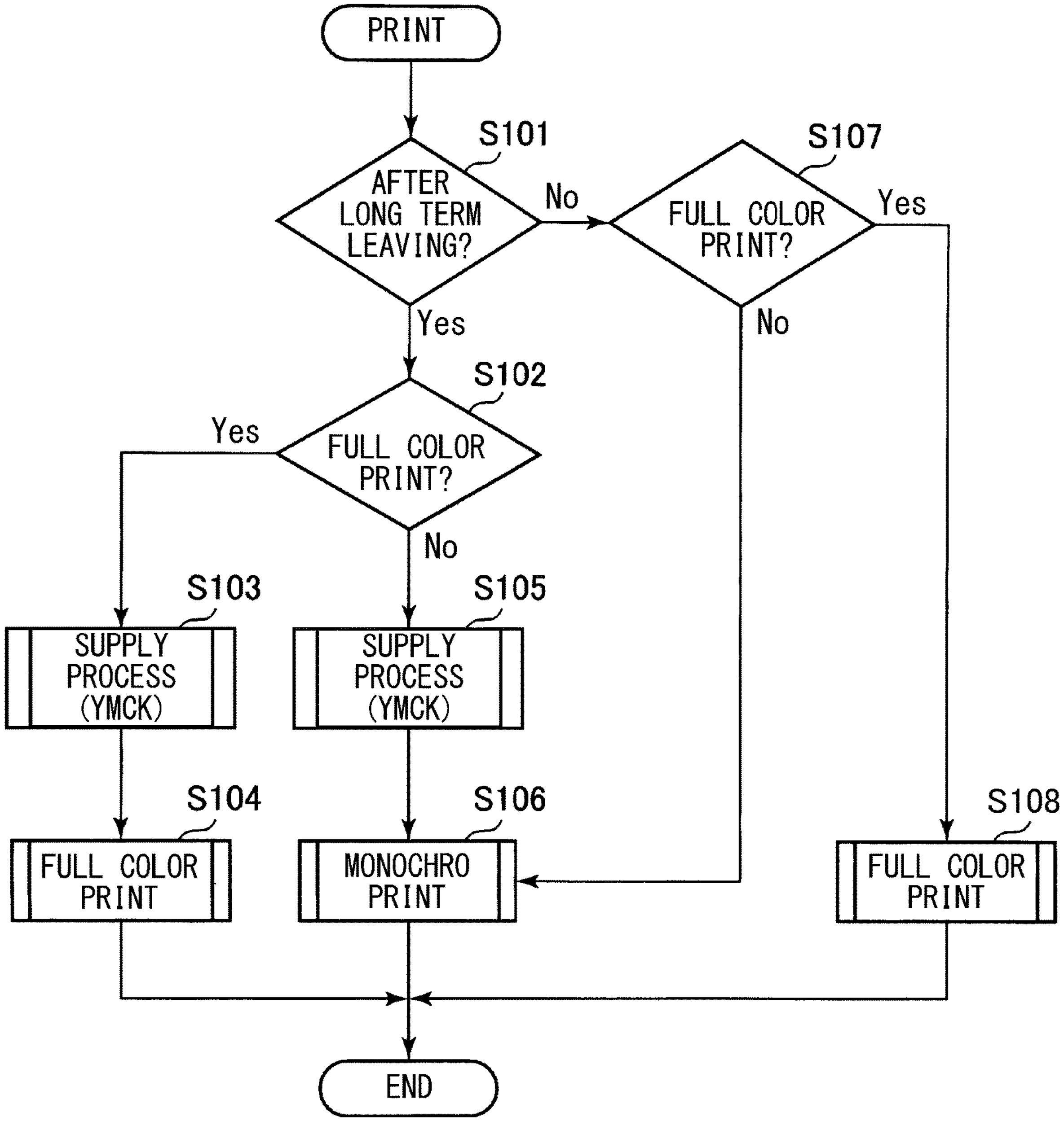
FIG. 6 is a flow chart showing an outline of job procedures in an embodiment 1.
Figure 7:
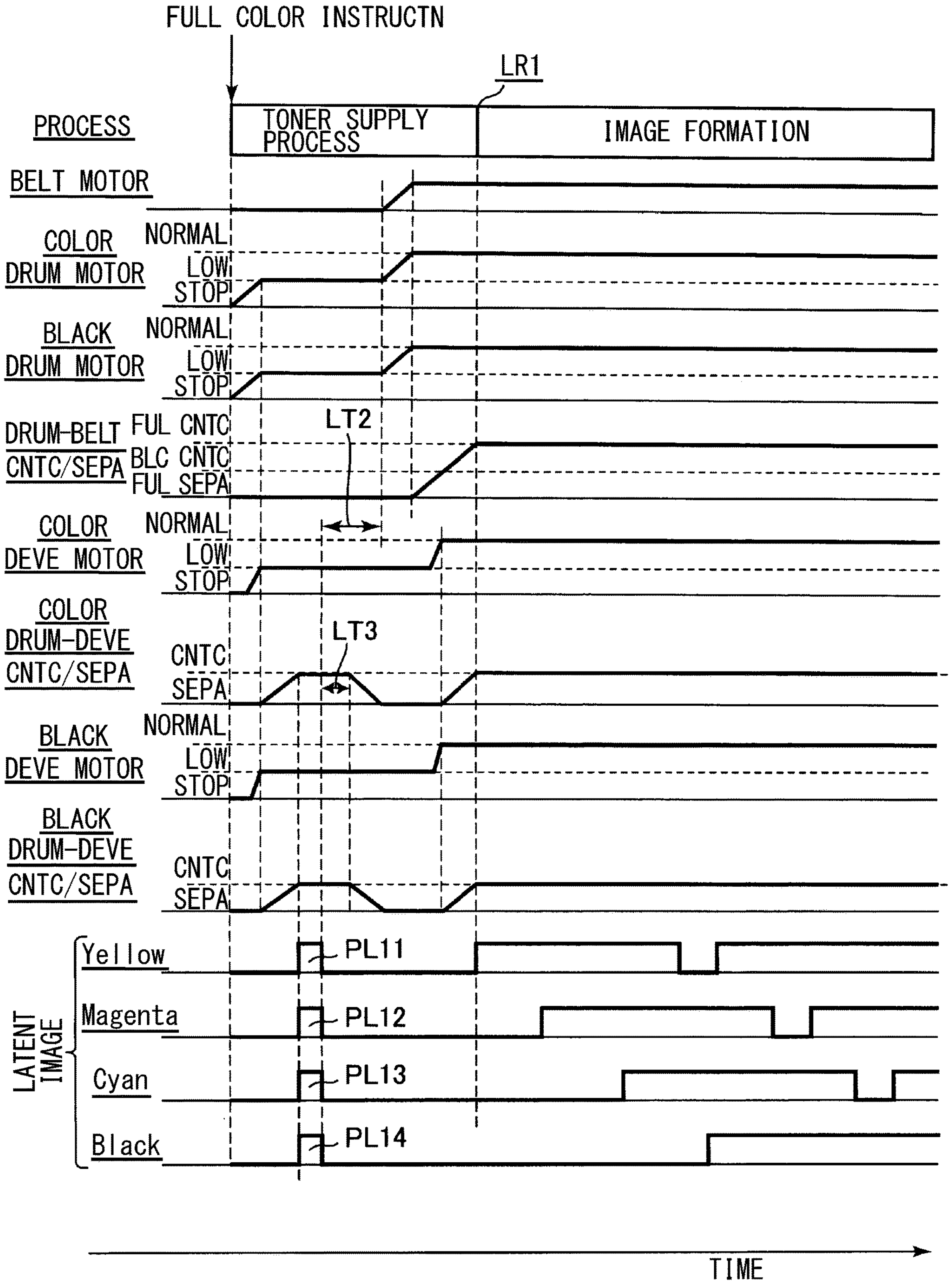
FIG. 7 is a timing chart of operations for the toner supply process and color printing after being left unused for a long time in the embodiment 1.

First, an operation in the embodiment, when full color printing is executed on a first job after being unused for a long time, will be described, FIG. 6 is the flow chart showing the outline of the job procedures in the embodiment. Further, FIG. 7 is the timing chart in the embodiment, showing the timing of the driving system operation and the timing of image (electrostatic latent image) forming in color printing during the toner supply process and its subsequent jobs in a case that the color printing is executed on the first job after being left unused for a long time.

With reference to FIG. 6, when the CPU 101 receives a printing instruction (in this case, a color printing instruction) from an external device, it determines whether or not the apparatus is after being left unused for a long time (S101). In the embodiment, the CPU 101 determines whether an elapsed time since the drum motor 21 is stopped, which is counted by the drum motor stop time counting portion 104, exceeds a predetermined threshold value which is set in advance. For example, in a case that the elapsed time since the drum motor 21 is stopped exceeds 12 hours, it may be determined that it is unused for a long time. Incidentally, the drum motor stop time counting portion 104 is an example of time acquisition portions which acquire information about a time (count value as an index value indicating time) while the color photosensitive drums 1Y, 1M and 1C (the color drum motor 21*a*) and the black photosensitive drum (the black drum motor 21*b*) are stopped, from an end of a previous job (color printing or monochrome printing) and until a start instruction for a current job (color printing or monochrome printing) is input to the CPU 101. The time acquisition portion may count and store a time while both the color photosensitive drums and the black photosensitive drum are stopped, or it may count and store a time that the color photosensitive drums are stopped and the black photosensitive drum is stopped, respectively. In this case, for example, it is possible to determine that it is in a state of being left unused for a long time in a case that a stop time of the color photosensitive drums exceeds a predetermined threshold, or it is possible to compare a stop time of a last stopped one of the color photosensitive drums and the black photosensitive drum.

In a case that the CPU 101 determines that it is in a state of being left unused for a long time ("Yes") in S101, next, the CPU 101 determines whether color printing is to be effected or not (S102). Since a case of color printing is described here, the CPU 101 determines that color printing is to be effected ("Yes") in S102 and the CPU 101 executes the toner supply process for each color of Y, M, C and K (S103). After that, the CPU 101 performs color printing (S104) and terminates the job.

Incidentally, in a case that the CPU 101 determines that it is not in a state of being left unused for a long time ("No") in S101, the CPU 101 determines whether color printing is to be effected or not in S107, and since a case of color printing is described here, it proceeds to S108 and executes color printing as described with reference to FIG. 3.

With reference to FIG. 7, in the embodiment, an operation of the toner supply process after being left unused for a long time (S103 in FIG. 6) and an operation of the color printing (image forming process) (S104 in FIG. 6) which is executed subsequent to the toner supply process will be described.

When the CPU 101 receives a color printing instruction from an external device, the CPU 101 starts driving of the color drum motor 21*a* and the black drum motor 21*b*. In this time, a target value of speed of each of the photosensitive drums 1Y, 1M, 1C and 1K (the color drum motor 21*a* and the black drum motor 21*b*) is set to be a lower speed (low speed) than a speed during image forming (normal speed). This is to prevent each of the drum motors 21 from stepping-out, since a frictional resistance between each of the photosensitive drums 1 and each of the cleaning blades 51 is high. On the other hand, the CPU 101 also starts driving of the color developing motor 22*a* and the black developing motor 22*b* at a predetermined timing. At this time, a target value of speed of each of the developing rollers 41Y, 41M, 41C and 41K (the color developing motor 21*a* and the black developing motor 21*b*) is set to be a lower speed (low speed) than a speed during image forming (normal speed) in accordance with the speed of the photosensitive drum 1 described above. And at a timing when the speeds of each of developing rollers 41Y, 41M, 41C and 41K and each of the photosensitive drums 1Y, 1M, 1C and 1K, which are pairs, are converged to predetermined speeds respectively, the CPU 101 starts an operation to contact each of the photosensitive drums 1Y, 1M, 1C and 1K with each of the developing rollers 41Y, 41M, 41C and 41K. Further, the CPU 101, at a timing when the contact is completed, simultaneously forms electrostatic latent images of supply toner images for each of colors Y, M, C, and K (from PL11 through PL14). After that, when time of LT2 is elapsed and the toner of the supply toner image which is formed on each of the photosensitive drums 1Y, 1M, 1C and 1K reaches a vicinity of the edge portion of each of the cleaning blades 51Y, 51M, 51C and 51K, the CPU 101 starts driving of the belt motor 23 at normal speed during image forming as a target value and also accelerates speed of each of photosensitive drums 1Y, 1M, 1C and 1K (the color drum motor 21*a* and the black drum motor 21*b*) from low speed to normal speed during image forming. And at a timing when the speeds of the intermediary transfer belt 30 and each of photosensitive drums 1Y, 1M, 1C and 1K are all converged to the normal speeds, the CPU 101 starts an operation to contact the intermediary transfer belt 30 with each of the photosensitive drums 1Y, 1M, 1C and 1K.

Further, after the completion of the electrostatic latent image forming of the supply toner image (from PL11 through PL14), when time of LT3 is elapsed and forming (developing) of the supply toner image onto each of the photosensitive drums 1Y, 1M, 1C and 1K is completed, the CPU 101 spaces each of the photosensitive drums 1Y, 1M, 1C and 1K from each of the developing rollers 41Y, 41M, 41C and 41K and accelerates the speeds of each of the developing rollers 41Y, 41M, 41C and 41K (the color developing motor 22*a* and the black developing motor 22*b*) from the low speed to the normal speed during image forming. And at a timing when the speeds of each of the developing rollers 41Y, 41M, 41C and 41K and each of photosensitive drums 1Y, 1M, 1C and 1K, which are pairs, are converged to the normal speeds respectively, the CPU 101 starts an operation to contact each of the photosensitive drums 1Y, 1M, 1C and 1K with each of the developing rollers 41Y, 41M, 41C and 41K. Further, at a timing (LR1) when contacting the intermediary transfer belt 30 with each of the photosensitive drums 1Y, 1M, 1C and 1K and contacting each of the photosensitive drums 1Y, 1M, 1C and 1K with each of the developing rollers 41Y, 41M, 41C and 41 K are completed, as a starting point, the CPU 101 starts forming electrostatic latent images for each of colors Y, M, C and K in order at predetermined intervals.

(Monochrome Printing After Being Unused for a Long Time in the Embodiment)

Figure 8:
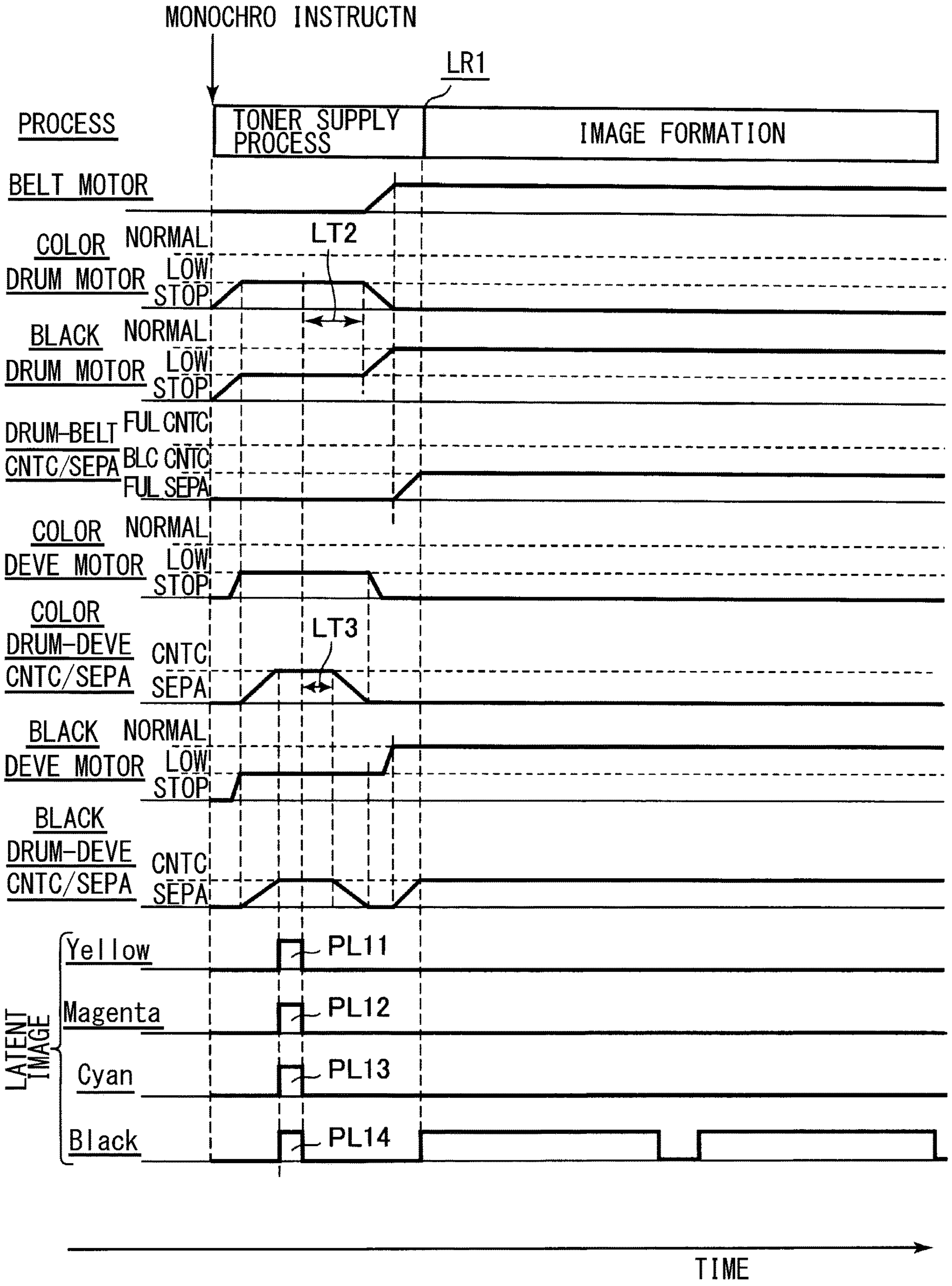
FIG. 8 is a timing chart of operations for the toner supply process and monochrome printing after being left unused for a long time in the embodiment 1.

Next, an operation in the embodiment, when monochrome printing is executed on a first job after being unused for a long time, will be described, The job procedures will be described with reference to FIG. 6. FIG. 8 is the timing chart in the embodiment, showing the timing of the driving system operation and the timing of image (electrostatic latent image) forming in monochrome printing during the toner supply process and its subsequent jobs in a case that the monochrome printing is executed on the first job after being left unused for a long time.

With reference to FIG. 6, when the CPU 101 receives a printing instruction (in this case, a monochrome printing instruction) from the external device, it determines whether or not the apparatus is after being left unused for a long time (S101). In a case that the CPU 101 determines that it is in a state of being left unused for a long time ("Yes") in S101, next, the CPU 101 determines whether color printing is to be effected or not (S102). Since a case of monochrome printing is described here, the CPU 101 determines that monochrome printing is to be effected ("No") in S102 and the CPU 101 executes the toner supply process for each color of Y, M, C and K (S105). After this, the CPU 101 executes monochrome printing (S106) and terminates the job.

Incidentally, in a case that the CPU 101 determines that it is not in a state of being left unused for a long time ("No") in S101, the CPU 101 determines whether color printing is to be effected or not in S107, and since a case of color printing is described here, it proceeds to S108 and executes monochrome printing as described with reference to FIG. 4.

With reference to FIG. 8, in the embodiment, the operation of the toner supply process after being left unused for a long time (S105 in FIG. 6) and the operation of the monochrome printing (image forming process) (S106 in FIG. 6) which is executed subsequent to the toner supply process will be described.

An operation, from a time when the CPU 101 receives a monochrome printing instruction from the external device to a time when electrostatic latent images of supply toner images (from PL11 through PL14) are formed, is the same as a case of color printing which is described with reference to FIG. 7. After that, when time of LT2 is elapsed and the toner of the supply toner image which is formed on each of the photosensitive drums 1Y, 1M, 1C and 1K reaches the vicinity of the edge portion of each of the cleaning blades 51Y, 51M, 51C and 51K, the CPU 101 starts driving of the belt motor 23 at normal speed during image forming as the target value, stops each of the color photosensitive drums 1Y, 1M and 1C (the color drum motor 21*a*), and accelerates the speed of the black photosensitive drum 1K (the black drum motor 21*b*) from the low speed to the normal speed during image forming. And at a timing when the speeds of the intermediary transfer belt 30 and the black photosensitive drum 1K are both converged to the normal speed, the CPU 101 starts the operation to contact the intermediary transfer belt 30 with the photosensitive drum 1K.

Further, after the completion of the electrostatic latent image forming of the supply toner image (from PL11 through PL14), when time of LT3 is elapsed and forming (developing) of the supply toner image onto each of the photosensitive drums 1Y, 1M, 1C and 1K is completed, the CPU 101 spaces each of the photosensitive drums 1Y, 1M, 1C and 1K from each of the developing rollers 41Y, 41M, 41C and 41K, stops each of the color developing rollers 41Y, 41M and 41C (the color developing motor 22*a*) and accelerates the speed of the black developing roller 41K (the black developing motor 22*b*) from the low speed to the normal speed during image forming. And at a timing when speeds of the black developing roller 41K and the black photosensitive drum 1K, which are a pair, are converged to normal speeds respectively, the CPU 101 starts the operation to contact the black photosensitive drum 1K with the black developing roller 41K. Further, at a timing (LR1) when contacting the intermediary transfer belt 30 with the black photosensitive drum 1K and contacting the black photosensitive drum 1K with the black developing roller 41K are completed, as a starting point, the CPU 101 starts forming electrostatic latent image for image forming of color K.

COMPARATIVE EXAMPLE

Next, as a comparative example, a control of a conventional toner supply process after being left unused for a long time will be described. Incidentally, a constitution of the comparative example is assumed to be same as a constitution of the embodiment, except that a control of the toner supply process after being left unused for a long time is different, which will be described below, so it will be described by attaching a same reference numeral as in the embodiment.

(Color Printing after being Left Unused for a Long Time in the Comparative Example)

First, in the comparative example, an operation in a case that color printing is executed in a first job after being left unused for a long time will be described.

Figure 9:
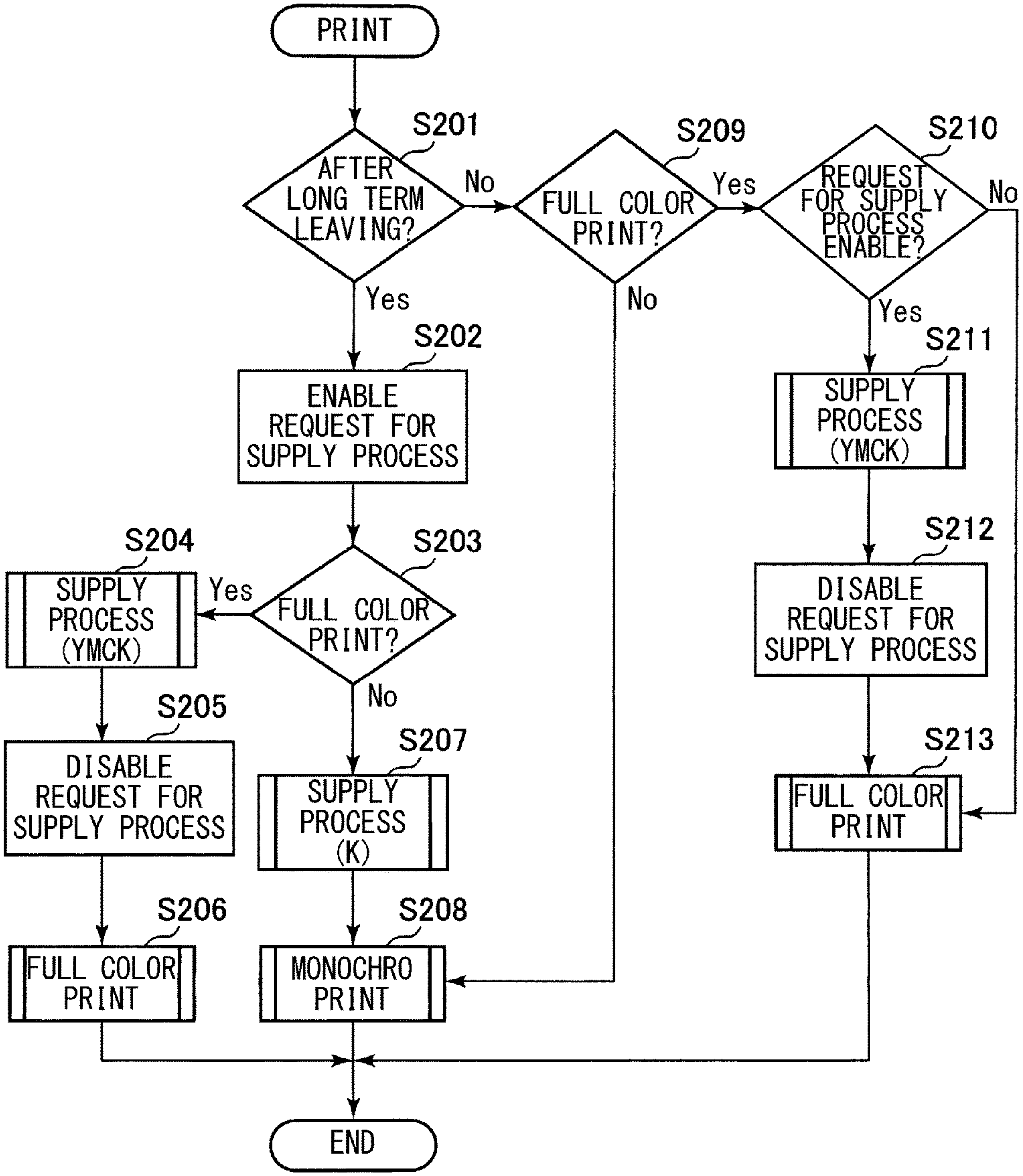
FIG. 9 is a flow chart showing an outline of job procedures in a comparative example.

FIG. 9 is the flow chart showing the outline of the job procedures in the comparative example. When the CPU 101 receives a printing instruction (in this case, a color printing instruction) from the external device, it determines whether or not the apparatus is being left unused for a long time (S201). In a case that the CPU 101 determines in S201 that it is in a state of being left unused for a long time ("Yes"), the CPU 101 enables an execution request of the toner supply process (S202). Specifically, for example, the RAM 103 stores information indicating that the execution request of the toner supply process is enabled. Next, the CPU 101 determines whether color printing is to be effected or not (S203). Since a case of color printing is described here, the CPU 101 determines that it is color printing ("Yes") in S203 and the CPU 101 executes the toner supply process for each color of Y, M, C and K (S204). After that, the CPU 101 disables the execution request of the toner supply process (S205). Specifically, for example, the RAM 103 stores information indicating that the execution request of the toner supply process is disabled (or the RAM 103 deletes information indicating that the execution request of the toner supply process is enabled). Next, the CPU 101 executes color printing (S206) and terminates the job.

On the other hand, in a case that the CPU 101 determines that it is not in a state of being left unused for a long time ("No") in S201, the CPU 201 determines whether color printing is to be effected or not in S107, and since a case of color printing is described here, it proceeds to S210 and checks whether the execution request of the toner supply process is enabled or not (S210). And in a case that the CPU 101 determines that the execution request of the toner supply process is enabled ("Yes"), the CPU 101 executes the toner supply process for each color of Y, M, C and K (S211). After that, the CPU 201 disables the execution request of the toner supply process (S212). Next, the CPU 101 executes color printing (S213) and terminates the job.

Here, operations of the toner supply process (S204, S211) and subsequent color printing (image forming process) (S206, S213) for each color of Y, M, C, and K described above may be the same as the operations which are described with reference to FIG. 7.

(Monochrome Printing after being Unused for a Long Time in the Comparative Example)

Next, an operation in the comparison example, when monochrome printing is executed on a job after being unused for a long time, will be described.

Figure 10:
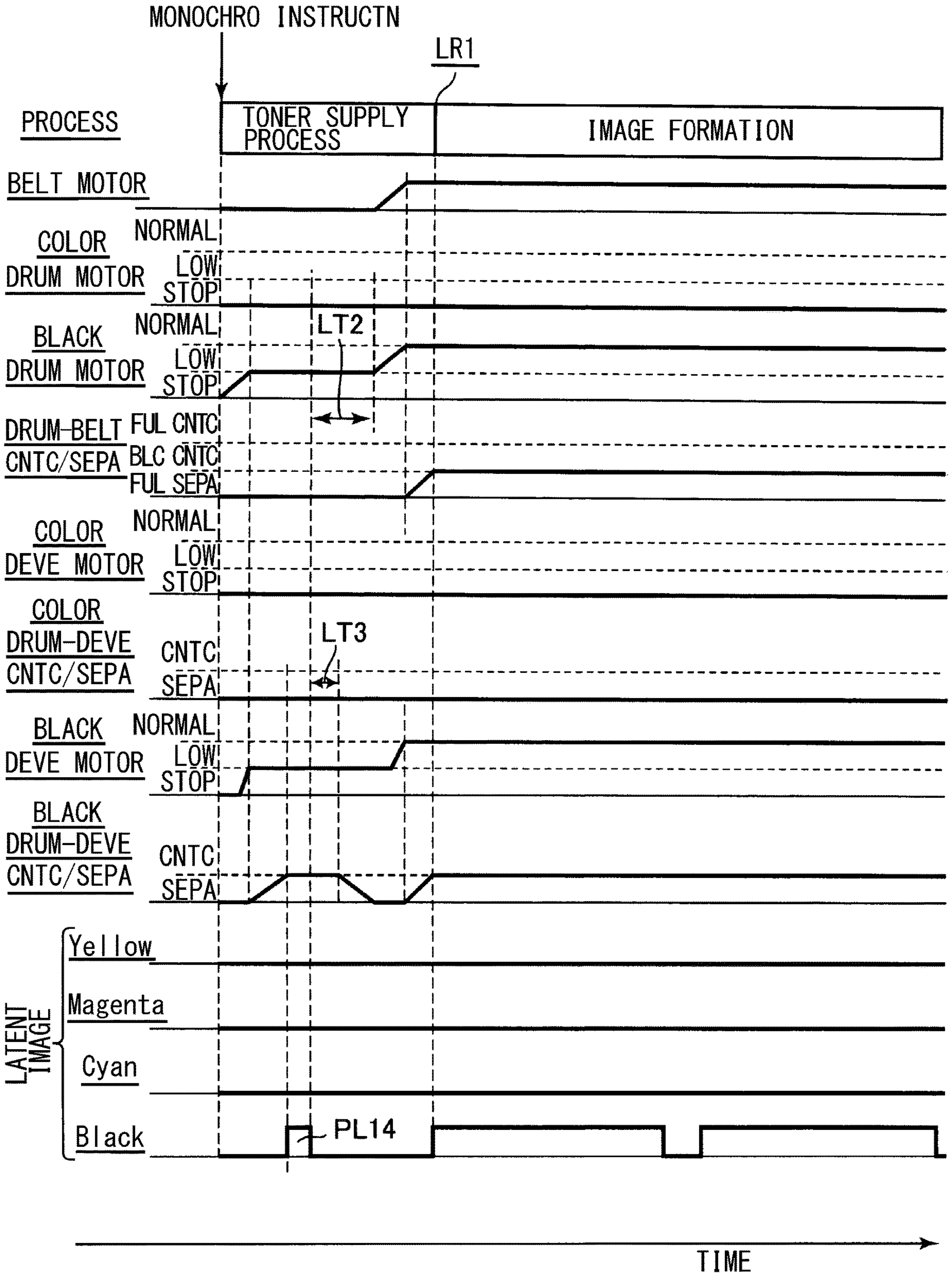
FIG. 10 is a timing chart of the operations for the toner supply process and the monochrome printing after being left unused for a long time in the comparative example.

The job procedures will be described with reference to FIG. 9. FIG. 10 is the timing chart in the comparative example, showing the timing of the driving system operation and the timing of image (electrostatic latent image) forming in monochrome printing during the toner supply process and its subsequent jobs in a case that the monochrome printing is executed on the first job after being left unused for a long time.

With reference to FIG. 9, when the CPU 101 receives a printing instruction (in this case, a monochrome printing instruction) from the external device, it determines whether or not the apparatus is after being left unused for a long time (S201). In a case that the CPU 101 determines in S201 that it is in a state of being left unused for a long time ("Yes"), the CPU 101 enables the execution request of the toner supply process (S202). Next, the CPU 101 determines whether color printing is to be effected or not (S203). Since a case of monochrome printing is described here, the CPU 101 determines that monochrome printing is to be effected ("No") in S203 and the CPU 101 executes the toner supply process for color K (S105). That is, since it is the case of monochrome printing, the toner supply process is executed only for color K. In this case, the toner supply process is not executed for each color of Y, M and C, so the execution request of the toner supply process remains enabled. Next, the CPU 101 executes monochrome printing (S208) and terminates the job.

Incidentally, in a case that the CPU 101 determines that it is not in a state of being left unused for a long time ("No") in S201, the CPU 101 determines whether color printing is to be effected or not in S209, and since a case of monochrome printing is described here, it proceeds to S208 and executes monochrome printing as described with reference to FIG. 4.

With reference to FIG. 10, in the comparative example, the operation of the toner supply process after being left unused for a long time (S207 in FIG. 9) and the operation of the monochrome printing (image forming process) (S208 in FIG. 9) which is executed subsequent to the toner supply process will be described.

When the CPU 101 receives a monochrome printing instruction from an external device, the CPU 101 starts driving of the black drum motor 21*b* at lower speed than normal speed during image forming as a target value. On the other hand, the CPU 101 also starts driving of the black developing motor 22*b* at a predetermined timing, at low speed as a target value in accordance with the speed of the photosensitive drum 1 described above. And at a timing when speeds of the black developing roller 41K and the black photosensitive drums 1K are both converged to the predetermined speed (low speed), the CPU 101 starts an operation to contact the black photosensitive drum 1K with the developing roller 41K. Further, the CPU 101, at a timing when the contact is completed, forms the electrostatic latent image of the supply toner image for color K (PL14). After that, when time of LT2 is elapsed and the toner of the supply toner image which is formed on the black photosensitive drum 1K reaches the vicinity of the edge portion of the black cleaning blade 51K, the CPU 101 starts driving of the belt motor 23 at normal speed during image forming as the target value and accelerates the speed of the black photosensitive drum 1K (the black drum motor 21*b*) from the low speed to the normal speed during image forming. And at a timing when the speeds of the intermediary transfer belt 30 and the black photosensitive drum 1K are both converged to the normal speeds, the CPU 101 starts the operation to contact the intermediary transfer belt 30 with the photosensitive drum 1K. On the other hand, after the completion of the electrostatic latent image forming (PL14), when time of LT3 is elapsed and forming (developing) of the supply toner image onto the black photosensitive drum 1K is completed, the CPU 101 temporarily spaces the black developing roller 41K from the black photosensitive drum 1K and accelerates the speed of the black developing roller 41K (the black developing motor 22*b*) from the low speed to the normal speed during image forming. And at a timing when the speeds of the black developing roller 41K and the black photosensitive drum 1K, which are the pair, are converged to the normal speeds respectively, the CPU 101 starts the operation to contact the black photosensitive drum 1K with the black developing roller 41K. Further, at a timing (LR1) when contacting the intermediary transfer belt 30 with the black photosensitive drum 1K and contacting the black photosensitive drum 1K with the black developing roller 41K are completed, as a starting point, the CPU 101 starts forming the electrostatic latent image for image forming of color K.

<Effect>

In the embodiment, when the monochrome printing is executed on the first job after being left unused for a long time, toner supply processes of all colors are executed. In this way, it is possible to eliminate necessity of the toner supply process when executing a first subsequent color printing (before being left unused for a long time, next time). In the comparative example described above, when the monochrome printing is executed on the first job after being left unused for a long time, only toner supply process of color K is executed. Thus, it is necessary to execute the toner supply process even when executing the first subsequent color printing (before being left unused for a long time, next time). That is, as shown in Table 1, the FPOT is extended for both the first monochrome printing and the first color printing in the comparative example. On the other hand, in the embodiment, it is possible to reduce chances to extend the FPOT, since the extension of the FPOT is only required for the first monochrome printing.

TABLE 1

| FPOT | After being left unused | | Normal | |
|---|---|---|---|---|
| Extension | Full Color | Monochrome | Full Color | Monochrome |
| EMB 1 | Yes | Yes | No | No |
| COM | Yes | Yes | (Yes)* | No |

*The FPOT is extended for the first color printing, after being left unused for a long time.

In general, in order to heat and fix the toner image on the recording material P by the fixing device 9, it is necessary to heat up fixing members such as the fixing roller pair 10 and 11, in advance. After being left unused for a long time, the FPOT tends to be longer since it takes time to heat up the fixing roller pair 10 and 11. In a case that heating up of the fixing roller pair 10 and 11 and the toner supply process are executed concurrently, the extension of the FPOT is substantially shorter. In the embodiment, it is possible to reduce the chances to extend the FPOT in a case that a time for heating up the fixing roller pair 10 and 11 is short, rather than a case after being left unused for a long time.

In this way, the image forming apparatus 100 in the embodiment includes the first image forming portion SK which includes a rotatable first image bearing member 1K, a first developing member 41K which supplies a first developer onto the surface of the first image bearing member 1K, and a first cleaning member 51K which forms a first contact portion Gb which contacts the first image bearing member 1K and cleans the surface of the first image bearing member 1K at the first contact portion Gb, the second image forming portions SY, SM and SC which include rotatable second image bearing members 1Y, 1M and 1C, second developing members 41Y, 41M and 41C which supply a second developer onto the surface of the second image bearing members 1Y, 1M and 1C, and second cleaning members 51Y, 51M and 51C which contact the second image members 1Y, 1M and 1C and form a second contact portion Ga and clean the surface of the second image bearing members 1Y, 1M and 1C in the second contact portion Ga, a first driving source 21*b* which drives the first image bearing member 1K and a second driving source 21*a* which drives the second image bearing members 1Y, 1M and 1C, a transfer means (each of the primary transfer rollers 6, the intermediary transfer belt 30, the secondary transfer roller 7, etc.) which is capable of transferring an image which is formed with the first developer in the first image forming portion SK and an image formed with the second developer in the second image forming portions SY, SM, SC onto the recording material P, a control portion 101 which is capable of controlling a first operation (monochrome printing) of forming an image which is transferred to the recording material P only in the first image forming portion SK among the first image forming portion SK and the second image forming portions SY, SM and SC, a second operation (color printing) of forming an image which is transferred to the recording material P in the first image forming portion SK and the second image forming portions SY, SM and SC, and a supplying operation (the toner supply process) of adhering the lubricant from the second developing members 41Y, 41M and 41C to the second image bearing members 1Y, 1M and 1C and supplying the lubricant to the second contact portion Ga by rotation of the second image bearing members 1Y, 1M and 1C, and a time acquisition portion 104 which acquires information about time when the first image bearing member 1K and the second image bearing members 1Y, 1M and 1C are stopped after the first operation or the second operation is completed and before a next start instruction of the first operation or the second operation is input to the control portion 101. And in the embodiment, when the start instruction for the first operation is input while the first image bearing member 1K and the second image bearing members 1Y, 1M and 1C are stopped, in a case that a time which is indicated by an acquired result of the time acquisition portion 104 exceeds a predetermined threshold value, the control portion 101 controls to execute the supplying operation from a time when the current start instruction for the first operation is input until a time when the next start instruction for the first operation or the second operation is input.

In particular, in the embodiment, the control portion 101 controls to execute the supplying operation (the first supplying operation) before forming image which is transferred to the recording material P on the first image bearing member 1K in the first operation which is executed by the current start instruction of the first operation. Further, in the embodiment, the control portion 101 controls to execute another supplying operation (the second supplying operation) which adheres the lubricant from the first developing member 41K to the first image bearing member 1K and supplies the lubricant to the first contact portion Gb by rotation of the first image bearing member 1K, during a period at least partially overlapping the supplying operation, before forming the image which is transferred to the recording material P onto the first image bearing member 1K in the first operation which is executed by the current start instruction of the first operation. Incidentally, the period of the supplying operation and the period of another supplying operation described above overlap at least partially means, more precisely, that a period from a start of the electrostatic latent image of the supply toner image to an end of the development of the supply toner image overlaps at least partially with the supplying operation and another supplying operation described above. In the embodiment, the supplying operation and another supplying operation described above are executed at substantially same time. Here, in the embodiment, a driving speed of the second image bearing members 1Y, 1M and 1C during execution of the supplying operation is lower than a driving speed of the second image bearing members 1Y, 1M and 1C when the image is formed on the second image bearing members 1Y, 1M and 1C in the second operation. Further, in the embodiment, a driving speed of the first image bearing member 1K during execution of the supplying operation described above is lower than a driving speed of the first image bearing member 1K when the image is formed on the first image bearing member 1K in the first operation and the second operation. Further, in the embodiment, the image forming apparatus 100 includes a plurality of the second image forming portions SY, SM and SC, and a second driving source 21*a* is a common driving source which drives each of the second image bearing members 1Y, 1M and 1C of the plurality of the second image forming portions SY, SM and SC.

As described above, according to the embodiment, by executing the toner supply process after being left unused for a long time, it is possible to suppress an increase in load at the startup of the drum motor 21 and to prevent a defect such as a step-out at the startup of the drum motor 21. Moreover, according to the embodiment, in a case that color printing is executed in the second and subsequent jobs after the execution of monochrome printing in the first job after being left unused for a long time, it is possible to reduce chances of extension of the FPOT and suppress lowering usability.

Next, another embodiment of the present invention will be described. A basic constitution and operation of the image forming apparatus in the embodiment are same as the image forming apparatus in the embodiment 1. Accordingly, in the image forming apparatus of the embodiment, elements having the same or corresponding functions or constitutions as those in the image forming apparatus in the embodiment 1 will be attached with same reference numerals as the embodiment 1 and detailed descriptions will be omitted.

As described above, the more moisture is absorbed by the adhered material on the surface of the photosensitive drum 1, the higher the friction coefficient between the photosensitive drum 1 and the cleaning blade 51 becomes. In the embodiment, a method of reducing an extension time of the FPOT by making an amount of toner which is supplied in the toner supply process after being left unused for a long time, variable according to a length of a period of being left unused and temperature and humidity environment, will be described. Incidentally, an amount of toner which is supplied in the toner supply process may be variable according to either the length of the period of being left unused or the temperature and humidity environment.

The toner supply process in the embodiment after being left unused for a long time is same as described with reference to FIG. 7 when the first job after being left unused for a long time is color printing, and same as described with reference to FIG. 8 when the first job after being left unused for a long time is monochrome printing. However, in the embodiment, the necessary amount of toner according to the length of the period of being left unused and the temperature and humidity environment is supplied, by controlling an exposure time during forming the electrostatic latent images from PL11 through PL14 in FIG. 7 and FIG. 8, as described below.

Here, in the embodiment, the image forming apparatus 100 includes the environmental sensor 105 (FIG. 2) which detects at least one of temperature or humidity inside or outside the image forming apparatus 100 as an environmental detection means which detects an environmental information in which the image forming apparatus 100 is installed. In the embodiment, the environmental sensor 105 is constituted of a temperature and humidity sensor which detects ambient temperature and humidity surrounding the image forming apparatus 100, and inputs information (signal) which indicates the detected temperature and information (signal) which indicates the detected humidity to the CPU 101. The CPU 101 is capable of calculating absolute moisture content as ambient temperature and humidity information based on the temperature information and humidity information which is obtained from the environmental sensor 105. And when the CPU 101 receives a print instruction, the CPU 101 selects a corresponding operating condition from among preset operating conditions which will be described below, based on the absolute moisture content which is obtained from a detection result of the environmental sensor 105 and a period of time being left unused which is obtained from the drum motor stop time counting portion 104.

Further, when much toner is supplied at one time to the edge portion of the cleaning blade 51 (a contact portion between the photosensitive drum 1 and the cleaning blade 51), the cleaning blade 51 is overloaded. Therefore, there is a concern that a portion of toner slips through the cleaning blade 51, which means a cleaning defect. Thus, the electrostatic latent image may be formed in halftone, or the toner may be supplied at some intervals in a plurality of steps. In the embodiment, a case in which toner is supplied in the plurality of steps will be described.

In the embodiment, an amount of toner supplied at one time is fixed, and number of supply times is variable according to the length of the period of being left unused and the temperature and humidity environment. Table 2 shows the number of toner supply times and the extension time of the FPOT for color printing in the embodiment, in which a reduction effect of the friction coefficient is obtained sufficiently. In the embodiment, absolute moisture content is used as ambient temperature and humidity information. Information, which indicates relationship between number of toner supply times, absolute moisture content, and time of being left unused as shown in Table 2, is set in advance as a table which shows operating conditions of the toner supply process, etc. and stored in the ROM 102

TABLE 2

| | | Number of toner supply times | | | Extension time of FPOT (s) | | |
|---|---|---|---|---|---|---|---|
| | | Time of being left unused | | | | | |
| | | 12-24 hr | 24-48 hr | 48 hr- | 12-24 hr | 24-48 hr | 48 hr- |
| Absolute | -5 g/m$^3$ | 1 | 2 | 3 | 0.54 | 0.98 | 1.42 |
| moisture | 5-15 g/m$^3$ | 3 | 4 | 5 | 1.42 | 1.86 | 2.3 |
| content | 15- g/m$^3$ | 10 | 15 | 20 | 4.5 | 6.7 | 8.9 |

In the embodiment, a width in a sub scanning direction of one of the supply toner images which are divided into the plurality steps is set to be 2 mm, a distance in the sub scanning direction between the adjacent supply toner images is set to be 20 mm, and a driving speed (low speed) of the photosensitive drum 1 during the toner supply process is set to be 50 mm/s (peripheral speed). Further, in the embodiment, various operating times for the toner supply process are as described below. Total sum, of a time (LT2) from forming the electrostatic latent image until the supply toner image reaches the cleaning blade 51, a transition time from low speed to normal speed of the drum motor 21, and a time for a contacting operation between the photosensitive drum 1 and the developing roller 41, is set to be 0.5 s.

For example, in an environment in which the absolute moisture content is 20 g/m$^3$, in a case that the time of being left unused is more than 48 hours, the number of toner supply is 20 times, and the time for the toner supply process is calculated as described below. A length in the sub scanning direction of a region in which the electrostatic latent image of the supply toner image is formed (from PL11 through PL14) is calculated as 420 mm, which is sum of the toner supply width of 40 mm (2 mm×20 times) and the interval of 20 mm×19 times. A time for forming the supply toner image in the region is calculated as 8.4 s by using the driving speed 50 mm/s (peripheral speed) of the photosensitive drum 1. Furthermore, by adding 0.5 s of various operation times described above, a time for the toner supply process becomes 8.9 s. And since a start of the image formation is extended by this amount of time, this time becomes the extended time of the FPOT as it is. Similarly, it is possible to calculate the time for the toner supply process in other absolute moisture content environments and time of being left unused.

In this way, in the embodiment, the control portion 101 sets an amount of the lubricant supplied in the supplying operation based on the acquired result of the time acquisition portion 104. In this case, the control portion 101 is possible to set so that a supply amount described above in a case that a time in which the acquired result of the time acquisition portion 104 indicates is a second time which is longer than a first time, is greater than a supply amount described above in a case that a time, in which the acquired result of the time acquisition portion 104 indicates, is the first time. Further, in the embodiment, the image forming apparatus 100 includes an environment acquisition portion 105 which acquires information on at least one of the ambient temperature or humidity, and the control portion 101 sets the supply amount of the lubricant in the supplying operation based on an acquired result of the environment acquisition portion 105. In this case, the control portion 101 is possible to set so that a supply amount described above in a case that an absolute moisture content in which the acquired result of the environment acquisition portion 105 indicates is a second value which is larger than a first value, is greater than a supply amount described above in a case that an absolute moisture content in which the acquired result of the environment acquisition portion 105 indicates is the first value. Further, in the embodiment, the control portion 101 changes the supply amount described above by changing the number of times the lubricant is supplied from the developing members 41Y, 41M, 41C and 41K to the image bearing members 1Y, 1M, 1C and 1K in the supplying operation.

The supply toner image with a width of 40 mm in the sub scanning direction, for example, is formed regardless of the temperature and humidity environment and the time of being left unused. In this method, when the absolute moisture content is less than 15 g/m$^3$ or the time of being left unused is less than 48 hours, the FPOT is extended excessively since an excessive amount of the toner is supplied as compared to an amount of the toner in which a reduction effect of friction coefficient is sufficiently obtained.

On the other hand, in the embodiment, it is possible to suppress an increase of the extension time of the FPOT and obtain a sufficient reduction effect of friction coefficient for either the first color printing or the first monochrome printing after being left unused for a long time by executing the toner supply process in accordance with the temperature and humidity environment and the time of being left unused.

Next, another embodiment of the present invention will be described. A basic constitution and operation of the image forming apparatus in the embodiment are same as the image forming apparatus in the embodiment 1. Accordingly, in the image forming apparatus of the embodiment, elements having the same or corresponding functions or constitutions as those in the image forming apparatus in the embodiment 1 will be attached with same reference numerals as the embodiment 1 and detailed descriptions will be omitted.

<Overview of the Embodiment>

In the embodiment 1 and the embodiment 2, the case in which the toner supply process is executed after being left unused for a long time for all of the image forming portions S is described, however, the present invention is not limited to such the case. For the black image forming portion SK, the toner supply process may not be required even after being left unused for a long time. This is due to such a reason which will be described below. In the color image forming portions SY, SM and SC, friction coefficients, between the cleaning blades 51 and the three photosensitive drums 1Y, 1M and 1C which are driven by a common color drum motor 21*a*, become larger. Thus, a load on the color drum motor 21*a* tends to be greater than expected. On the other hand, in the black (monochrome) image forming portion SK, a friction coefficient between only one photosensitive drum 1K, which is driven by the black drum motor 21*b*, and the cleaning blade 51, becomes larger.

In the embodiment, a case in which the toner supply process after being left unused for a long time is executed only in the color image forming portions SY, SM, and SC will be described.

<Color Printing after being Left Unused for a Long Time in the Embodiment>

First, in the embodiment, an operation, in a case that color printing is executed in the first job after being left unused for a long time, will be described.

Figure 11:
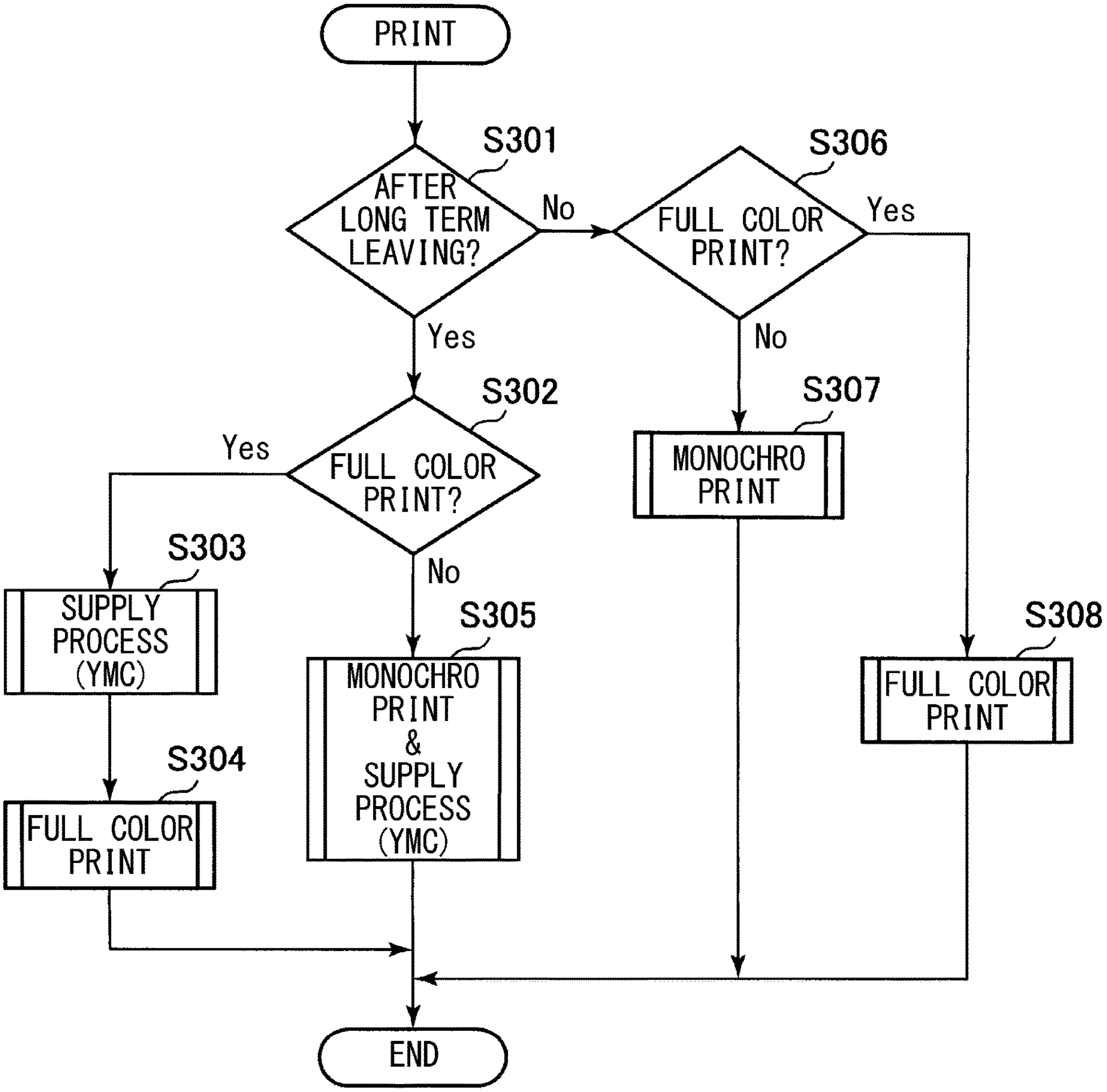
FIG. 11 is a flow chart showing an outline of job procedures in an embodiment 3.

FIG. 11 is the flow chart showing the outline of the job procedures in the embodiment. Further, FIG. 12 is the timing chart in the embodiment, showing the timing of the driving system operation and the timing of image (electrostatic latent image) forming in color printing during the toner supply process and its subsequent jobs in a case that the color printing is executed on the first job after being left unused for a long time.

With reference to FIG. 11, when the CPU 101 receives a printing instruction (in this case, a color printing instruction) from the external device, it determines whether or not the apparatus is after being left unused for a long time (S301). Incidentally, in the embodiment, the drum motor stop time counting portion 104 may count and store an elapsed time since the color drum motor 21*a* is stopped. In a case that the CPU 101 determines that it is in a state of being left unused for a long time ("Yes") in S301, next, the CPU 101 determines whether color printing is to be effected or not (S302). Since a case of color printing is described here, the CPU 101 determines that it is color printing ("Yes") in S302 and the CPU 101 executes the toner supply process for each color of Y, M, C and K (S303). After that, the CPU 101 performs color printing (S304) and terminates the job.

Incidentally, in a case that the CPU 101 determines that it is not in a state of being left unused for a long time ("No") in S301, the CPU 101 determines whether color printing is to be effected or not in S306, and since a case of color printing is described here, it proceeds to S308 and executes color printing as described with reference to FIG. 3.

Figure 12:
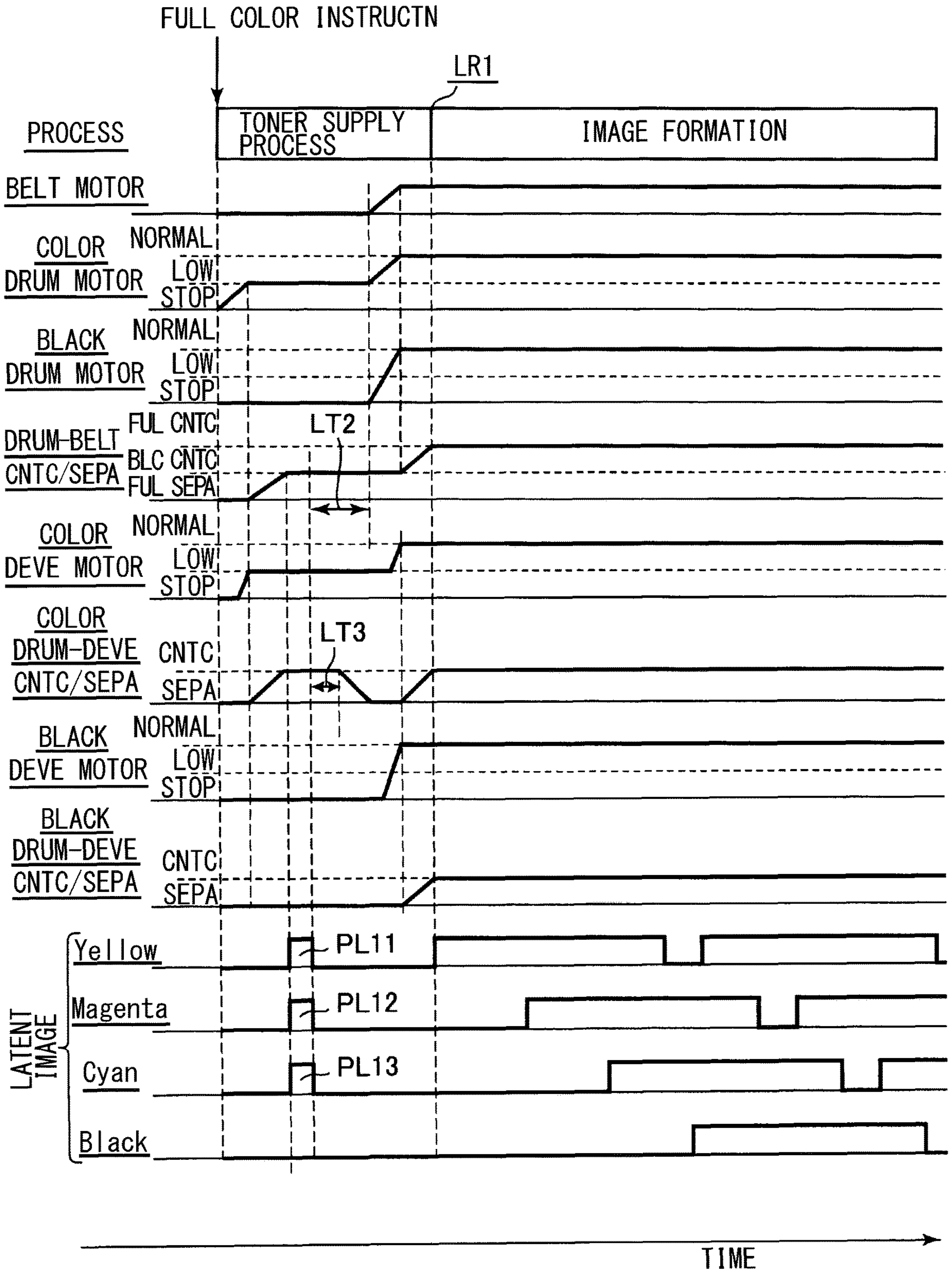
FIG. 12 is a timing chart of the operations for the toner supply process and the color printing after being left unused for a long time in the embodiment 3.

With reference to FIG. 12, in the embodiment, the operation of the toner supply process after being left unused for a long time (S303 in FIG. 12) and the operation of the color printing (image forming process) (S304 in FIG. 12) which is executed subsequent to the toner supply process will be described.

When the CPU 101 receives a color printing instruction from the external device, the CPU 101 starts driving of the color drum motor 21*a*. In this time, a target value of speed of each of the color photosensitive drums 1Y, 1M and 1C (the color drum motor 21*a*) is set to be a lower speed (low speed) than a speed during image forming (normal speed). This is to prevent the color drum motor 21*a* from stepping-out, since a frictional resistance between each of the color photosensitive drums 1Y, 1M and 1C and each of the color cleaning blades 51Y, 51M and 51C is high. On the other hand, the CPU 101 also starts driving of the color developing motor 22*a* at a predetermined timing, at low speed as a target value in accordance with the speed of the photosensitive drum 1 described above. And at a timing when speeds of each of the paired color developing rollers 41Y, 41M and 41C and each of the color photosensitive drums 1Y, 1M and 1C are all converged to the predetermined speed, the CPU 101 starts an operation to contact each of the color photosensitive drums 1Y, 1M and 1C with each of the color developing rollers 41Y, 41M and 41C. Further, in the embodiment, at this timing, the CPU 101 starts the operation to contact the intermediary transfer belt 30 with the black photosensitive drum 1K. Further, at the timing when the contact is completed, the CPU 101 executes to form the electrostatic latent images of the supply toner images for each of colors Y, M and C, simultaneously (from PL 11 through PL13). After that, when time of LT2 is elapsed and the toner of the supply toner image which is formed on each of the color photosensitive drums 1Y, 1M and 1C reaches the vicinity of the edge portion of each of the color cleaning blades 51Y, 51M and 51C, the CPU 101 starts driving of the belt motor 23 at normal speed during image forming as the target value and driving of the black drum motor 21*b*, and accelerates the speed of each of the color photosensitive drums 1Y, 1M and 1C (the color drum motor 21*a*) from the low speed to the normal speed during image forming. And at a timing when the speeds of the intermediary transfer belt 30 and each of photosensitive drums 1Y, 1M, 1C and 1K are all converged to the normal speeds, the CPU 101 starts the operation to contact the intermediary transfer belt 30 with each of the color photosensitive drums 1Y, 1M and 1C. Incidentally, at this timing, an operation to contact the intermediary transfer belt 30 with the color and black photosensitive drums 1Y, 1M, 1C and 1K may be started.

Further, after the completion of the electrostatic latent image forming of the supply toner image (from PL11 through PL14), when time of LT3 is elapsed and forming (developing) of the supply toner image onto each of the color photosensitive drums 1Y, 1M and 1C is completed, the CPU 101 temporarily spaces each of the color photosensitive drums 1Y, 1M and 1C from each of the color developing rollers 41Y, 41M and 41C, accelerates the speeds of each of the color developing rollers 41Y, 41M and 41C (the color developing motor 22*a*) from the low speed to the normal speed during image forming and starts driving of the black developing roller 41K (the black developing motor 22*b*) at normal speed during image forming as the target value. And at a timing when the speeds of each of the developing rollers 41Y, 41M, 41C and 41K and each of photosensitive drums 1Y, 1M, 1C and 1K, which are pairs, are converged to the normal speeds respectively, the CPU 101 starts an operation to contact each of the photosensitive drums 1Y, 1M, 1C and 1K with each of the developing rollers 41Y, 41M, 41C and 41K. Further, at a timing (LR1) when contacting the intermediary transfer belt 30 with each of the photosensitive drums 1Y, 1M, 1C and 1K and contacting each of the photosensitive drums 1Y, 1M, 1C and 1K with each of the developing rollers 41Y, 41M, 41C and 41 K are completed, as a starting point, the CPU 101 starts forming electrostatic latent images for each of colors Y, M, C and K in order at predetermined intervals.

<Monochrome Printing After Being Unused for a Long Time in the Example>

Next, an operation in the embodiment, when monochrome printing is executed on a first job after being unused for a long time, will be described.

Figure 13:
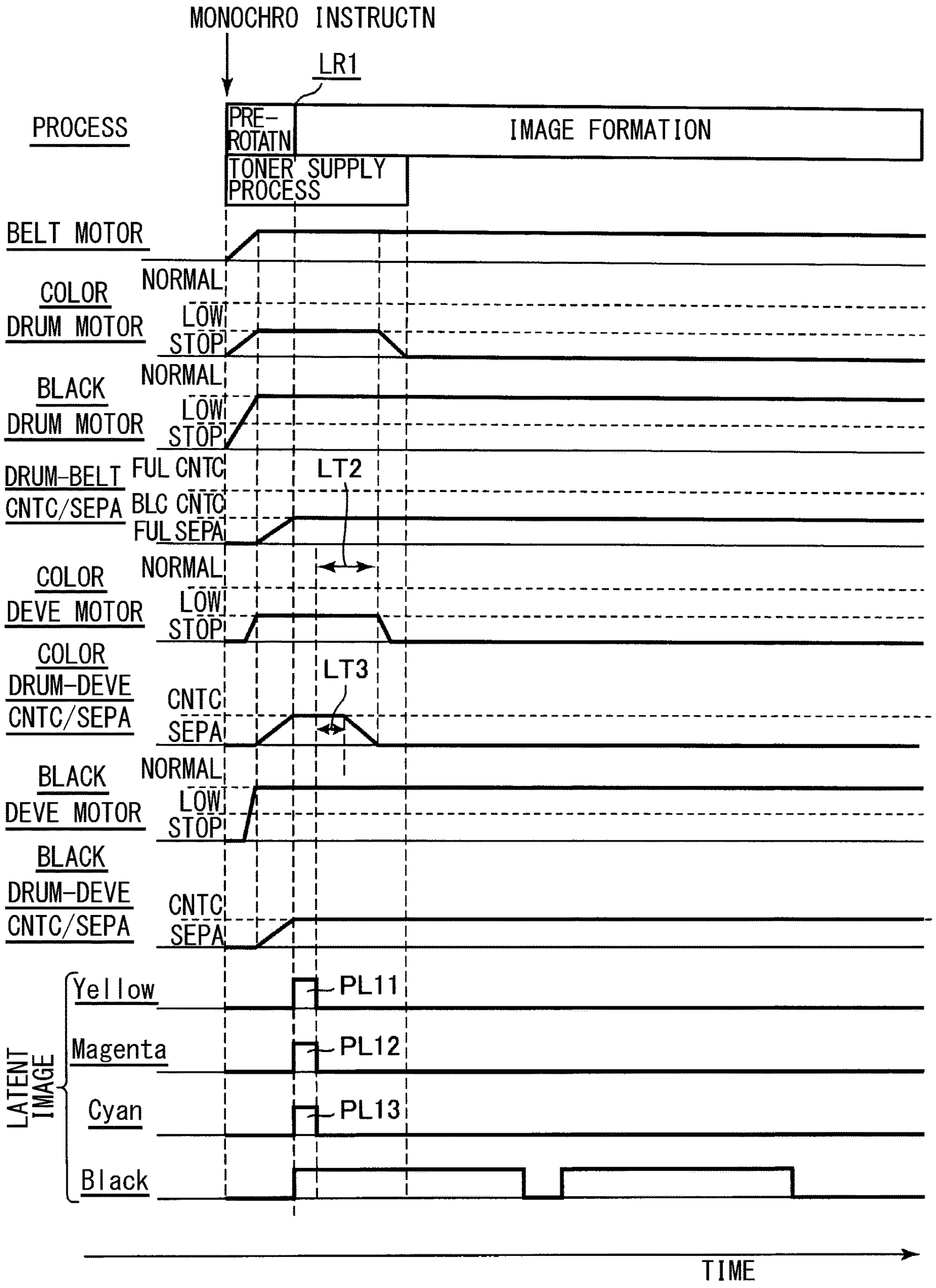
FIG. 13 is a timing chart of the operations for the toner supply process and the monochrome printing after being left unused for a long time in the embodiment 3.

The job procedures will be described with reference to FIG. 11. FIG. 13 is the timing chart in the embodiment, showing the timing of the driving system operation and the timing of image (electrostatic latent image) forming in monochrome printing during the toner supply process and its subsequent jobs in a case that the monochrome printing is executed on the first job after being left unused for a long time.

With reference to FIG. 11, when the CPU 101 receives a printing instruction (in this case, a monochrome printing instruction) from the external device, it determines whether or not the apparatus is after being left unused for a long time (S301). In a case that the CPU 101 determines that it is in a state of being left unused for a long time ("Yes") in S301, next, the CPU 101 determines whether color printing is to be effected or not (S302). Since a case of monochrome printing is described here, the CPU 101 determines that monochrome printing is to be effected ("No") in S302, and monochrome printing and the toner supply process for each of colors Y, M and C are executed simultaneously (S305), and the job is terminated.

Incidentally, in a case that the CPU 101 determines that it is not in a state of being left unused for a long time ("No") in S301, the CPU 101 determines whether color printing is to be effected or not in S306, and since a case of monochrome printing is described here, it proceeds to S308 and executes monochrome printing as described with reference to FIG. 4.

In the embodiment, operations of the toner supply process and monochrome printing (image forming process) (S305 in FIG. 11) after being left unused for a long time, which are executed simultaneously, will be described with reference to FIG. 13.

When the CPU 101 receives a monochrome printing instruction from the external device, the CPU 101 starts driving of the belt motor 23, driving of the color drum motor 21*a* and driving of the black drum motor 21*b*. At this time, a target value of speed of each of the color photosensitive drums 1Y, 1M and 1C (the color drum motor 21*a*) is set to be a lower speed (low speed) than a speed during image forming (normal speed). This is to prevent the color drum motor 21*a* from stepping-out, since a frictional resistance between each of the color photosensitive drums 1Y, 1M and 1C and each of the color cleaning blades 51Y, 51M and 51C is high. On the other hand, driving of the belt motor 23 and the black drum motor 21*b* is started at the normal speed during image forming as the target value. And at a timing when the speeds of the intermediary transfer belt 30 and the black photosensitive drum 1K are converged to predetermined speeds, the CPU 101 starts an operation to contact the black photosensitive drum 1K with the intermediary transfer belt 30. On the other hand, the CPU 101 also starts driving of the color developing motor 22*a* and the black developing motor 22*b* at a predetermined timing, at low speed and normal speed as a target value in accordance with the speed of the photosensitive drum 1 described above, respectively. And at a timing when the speeds of each of the developing rollers 41Y, 41M, 41C and 41K and each of the photosensitive drums 1Y, 1M, 1C and 1K, which are pairs, are converged to predetermined speeds respectively, the CPU 101 starts an operation to contact each of the photosensitive drums 1Y, 1M, 1C and 1K with each of the developing rollers 41Y, 41M, 41C and 41K. Further, at the timing LR1 when the contact is completed, the CPU 101 executes to form the electrostatic latent images of the supply toner images for each of colors Y, M and C, simultaneously (from PL 11 through PL13). After that, when time of LT2 is elapsed and the toner of the supply toner image which is formed on each of the color photosensitive drums 1Y, 1M and 1C reaches the vicinity of the edge portion of each of the color cleaning blades 51Y, 51M and 51C, the CPU 101 stops each of the color photosensitive drums 1Y, 1M and 1C (the color drum motor 21*a*). Further, after the completion of the electrostatic latent image forming of the supply toner image (from PL11 through PL14), when time of LT3 is elapsed and forming (developing) of the supply toner image onto each of the color photosensitive drums 1Y, 1M and 1C is completed, the CPU 101 spaces each of the color photosensitive drums 1Y, 1M and 1C from each of the color developing rollers 41Y, 41M and 41C, and stops each of the color developing rollers 41Y, 41M and 41C (the color developing motor 22*a*). On the other hand, in the black image forming portion SK, forming an electrostatic latent image for image forming is started at the timing LR1 described above.

In this way, in the embodiment, the control portion 101 controls to execute the supplying operation in a period overlapping with at least a part of a period when the image, which is transferred to the recording material P in the first operation which is executed by the current start instruction of the first operation (monochrome printing), is formed on the first image bearing member 1K. Incidentally, the period when the image is formed on the first image bearing member 1K in the first operation described above is, more precisely, a period from starting of the formation of the electrostatic latent image of the first image on the first image bearing member 1K until developing of the last image is completed. And the period may be overlapped, at least partially, with a period from starting of the formation of the electrostatic latent image of the supply toner image in the supplying operation until developing of the supply toner image is completed.

<Effect>

In the embodiment, in a constitution that the toner supply process after being left unused for a long time is required only for the color image forming portions SY, SM and SC, when the monochrome printing is executed on the first job after being left unused for a long time, the toner supply process in the color image forming portions SY, SM and SC is executed. By this method, it is possible to eliminate necessity for the toner supply process when the first color printing is executed after this. Further, as shown in Table 3, in the embodiment, during the first monochrome printing, the toner supply process in the color image forming portions SY, SM and SC is executed in parallel with image forming, an extension time of the FPOT is not involved.

TABLE 3

| FPOT | After being left unused | | Normal | |
|---|---|---|---|---|
| Extension | Full color | Monochrome | Full color | Monochrome |
| EMB 3 | Yes | No | No | No |
| EMB 1 | Yes | Yes | No | No |

That is, according to the embodiment, it is possible to reduce the chances to extend the FPOT in the constitution that the toner supply process after being left unused for a long time is required only for the color image forming portions SY, SM and SC.

Incidentally, it is also possible to combine the control based on leaving time and temperature/humidity environment described in the embodiment 2 for the control in the embodiment. In this case, it is possible to suppress the increase of the extension time of the FPOT and obtain a sufficient reduction effect of friction coefficient for the first color printing after being left unused for a long time.

Next, another embodiment of the present invention will be described. A basic constitution and operation of the image forming apparatus in the embodiment are same as the image forming apparatus in the embodiment 1. Accordingly, in the image forming apparatus of the embodiment, elements having the same or corresponding functions or constitutions as those in the image forming apparatus in the embodiment 1 will be attached with same reference numerals as the embodiment 1 and detailed descriptions will be omitted.

<Overview of the Embodiment>

In the embodiment 3, when monochrome printing is executed on the first job after being unused for a long time, a method that the toner supply process for each of colors Y, M and C and monochrome printing are executed simultaneously is described. However, in this method, it may not be possible to ensure the necessary toner supply process time, especially in a case that the number of sheets which are printed for the first monochrome printing is small. In this case, when the color printing is executed next time, the concern for stepping-out of the motor remains and it is necessary to execute the toner supply process, so an effect of reducing the chances to extend the FPOT is limited.

For example, as described in FIG. 3, in the environment in which the absolute moisture content is 20 g/m$^3$, in a case that the time of being left unused is more than 48 hours, when the toner supply process is executed with driving speed (peripheral speed) of the photosensitive drum 1 as 50 mm/s (low speed), time required is 8.9 seconds. On the other hand, when the driving speed (peripheral speed) of the photosensitive drum 1 during image forming is 200 mm/s (normal speed), the time required to print an image of an A4 vertical size (297 mm) is 1.5 seconds. Therefore, depending on sheet intervals, the toner supply process may not be completed before image forming is ended even in a case of printing five pages.

Thus, in the embodiment, when the monochrome printing is executed on the first job after being left unused for a long time, the toner supply processes of each of colors Y, M and C are executed during the non-image forming time after executing the monochrome printing.

<Monochrome Printing after being Unused for a Long Time in the Embodiment>

Figure 14:
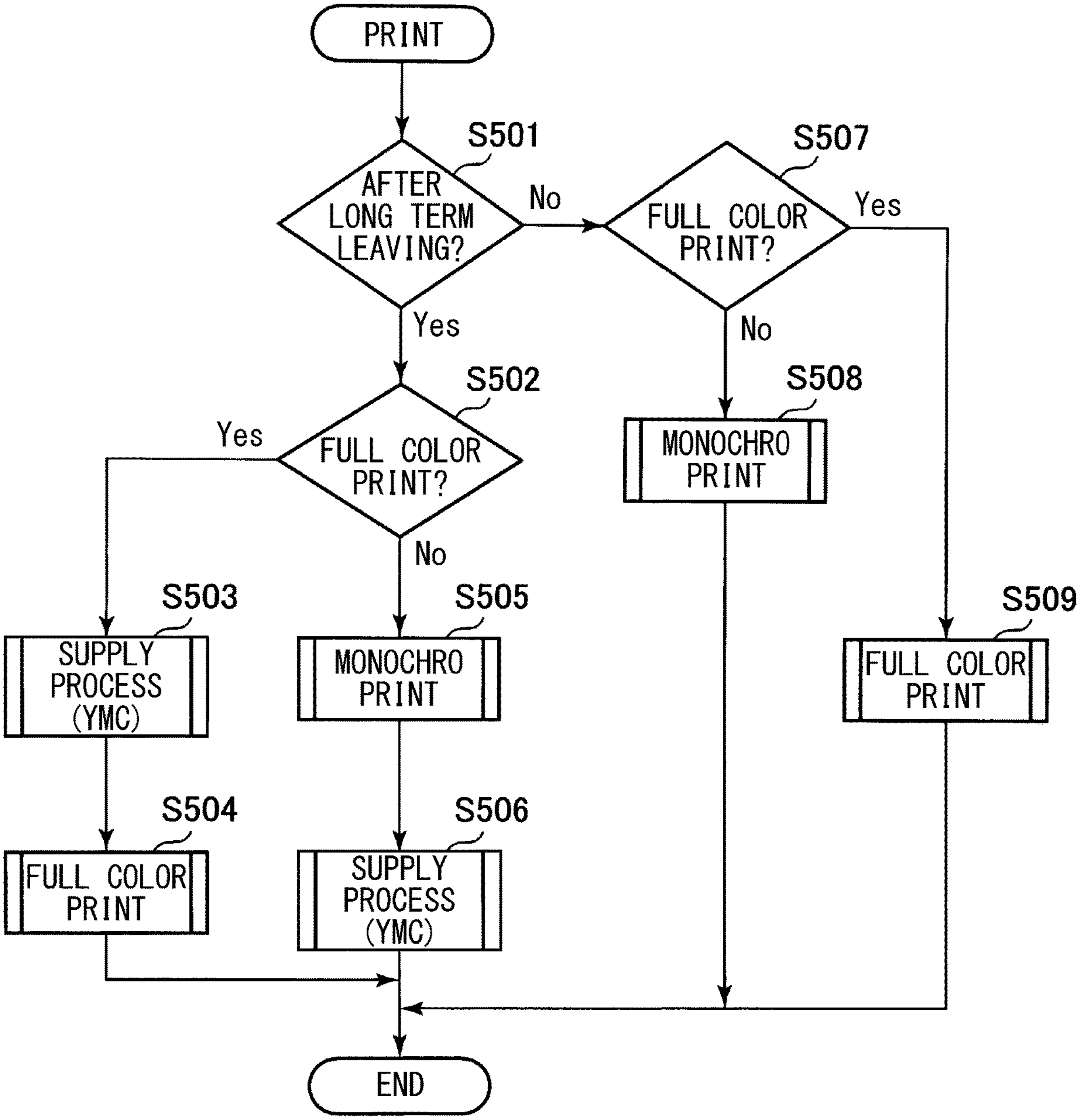
FIG. 14 is a flow chart showing an outline of job procedures in an embodiment 4.

An operation in the embodiment, when monochrome printing is executed on a first job after being unused for a long time, will be described. Incidentally, in the embodiment, the operation in the case that color printing is executed in the first job after being left unused for a long time may be same as the operation which is described in the embodiment 3. FIG. 14 is the flow chart showing the outline of the job procedures in the embodiment. Further, FIG. 15 is the timing chart in the embodiment, showing the timing of the driving system operation and the timing of image (electrostatic latent image) forming in monochrome printing during the toner supply process and its subsequent jobs in a case that the monochrome printing is executed on the first job after being left unused for a long time.

With reference to FIG. 14, when the CPU 101 receives a printing instruction (in this case, a monochrome printing instruction) from the external device, it determines whether or not the apparatus is after being left unused for a long time (S501). In a case that the CPU 101 determines that it is in a state of being left unused for a long time ("Yes") in S501, next, the CPU 101 determines whether color printing is to be effected or not (S502). Since a case of monochrome printing is described here, the CPU 101 determines that monochrome printing is to be effected ("No") in S502, and monochrome printing is executed (S505). After that, the CPU 101 executes the toner supply process for each of colors Y, M and C (S506) and terminates the job.

Incidentally, in a case that the CPU 101 determines that it is not in a state of being left unused for a long time ("No") in S501, the CPU 101 determines whether color printing is to be effected or not in S507, and since a case of monochrome printing is described here, it proceeds to S508 and executes monochrome printing as described with reference to FIG. 4.

Figure 15:
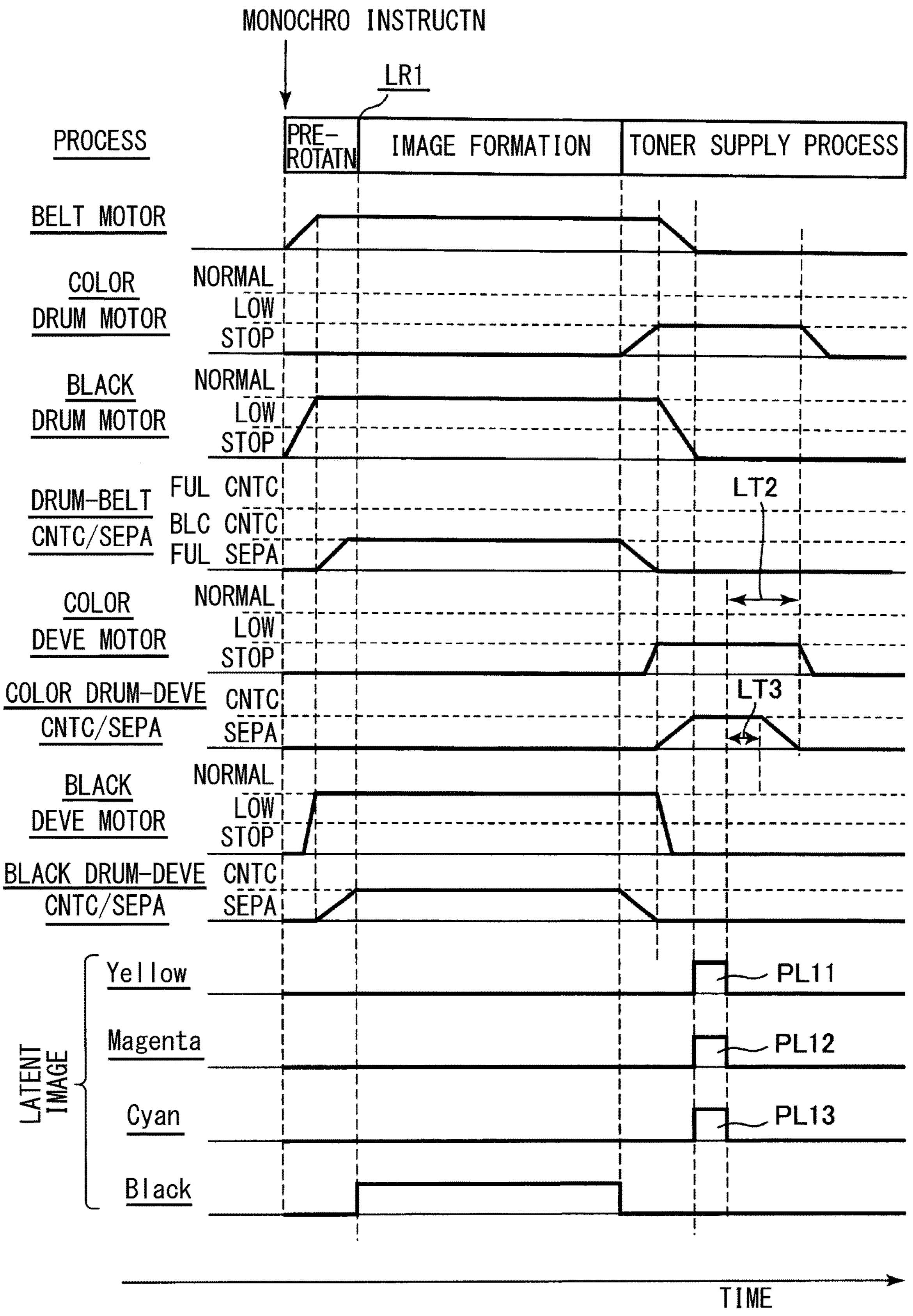
FIG. 15 is a timing chart of operations for the monochrome printing and the toner supply process after being left unused for a long time in the embodiment 4.

With reference to FIG. 15, in the embodiment, the operation of the monochrome printing after being left unused for a long time (image forming process) (S505 in FIG. 14) and the operation of the toner supply process (S506 in FIG. 14) which is executed subsequent to the monochrome printing will be described.

The operation, from the time when the CPU 101 receives the monochrome printing instruction from the external device to the time when the CPU 101 executes the image formation is the same as the case which is described with reference to FIG. 4. After image forming is completed, the CPU 101 spaces the intermediary transfer belt 30 from the black photosensitive drum 1K and stops the black drum motor 21*b* and the belt motor 23. Further, the CPU 101 spaces the black developing roller 41K from the black photosensitive drum 1K and stops the black developing motor 22*b*. Further, the CPU 101 starts driving of the color drum motor 21*a*. At this time, a target value of speed of each of the color photosensitive drums 1Y, 1M and 1C (the color drum motor 21*a*) is set to be a lower speed (low speed) than a speed during image forming (normal speed). This is to prevent the color drum motor 21*a* from stepping-out, since a frictional resistance between each of the color photosensitive drums 1Y, 1M and 1C and each of the color cleaning blades 51Y, 51M and 51C is high. On the other hand, the CPU 101 also starts driving of the color developing motor 22*a* at a predetermined timing, at low speed as a target value in accordance with the speed of the photosensitive drum 1 described above. And at a timing when the speeds of each of the color developing rollers 41Y, 41M, 41C and 41K and each of the photosensitive drums 1Y, 1M, 1C and 1K, which are pairs, are converged to predetermined speeds respectively, the CPU 101 starts an operation to contact each of the color photosensitive drums 1Y, 1M and 1C with each of the color developing rollers 41Y, 41M and 41C. Further, at the timing when the contact is completed, the CPU 101 executes to form the electrostatic latent images of the supply toner images for each of colors Y, M and C, simultaneously (from PL 11 through PL13). After that, when time of LT2 is elapsed and the toner of the supply toner image which is formed on each of the color photosensitive drums 1Y, 1M and 1C reaches the vicinity of the edge portion of each of the cleaning blades 51Y, 51M and 51C, the CPU 101 stops each of the color photosensitive drums 1Y, 1M and 1C (the color drum motor 21*a*). Further, after the completion of the electrostatic latent image forming of the supply toner image (from PL11 through PL14), when time of LT3 is elapsed and forming (developing) of the supply toner image onto each of the color photosensitive drums 1Y, 1M and 1C is completed, the CPU 101 spaces each of the color photosensitive drums 1Y, 1M and 1C from each of the color developing rollers 41Y, 41M and 41C, and stops each of the color developing rollers 41Y, 41M and 41C (the color developing motor 22*a*).

By means of such a control, it is possible to supply the toner in a vicinity of the edge portion of the cleaning blade 51 (the contact portion between the photosensitive drum 1 and the cleaning blade 51) in each of the color image forming portions SY, SM, and SC. Therefore, in the color image forming portions SY, SM and SC, it is possible to reduce the friction coefficient between the photosensitive drum 1 and the cleaning blade 51 and to prevent a defect such as a stepping-out of the color drum motor 21*a*.

In this way, in the embodiment, the control portion 101 controls to execute the supplying operation after the image, which is transferred to the recording material P in the first operation which is executed by the current start instruction of the first operation (monochrome printing), is formed on the first image bearing member 1K.

<Effect>

In the embodiment, when the monochrome printing is executed on the first job after being left unused for a long time, the toner supply process in the color image forming portions SY, SM and SC is executed. In this way, even when the monochrome printing job is short, it is possible to supply the toner in necessary amount for the toner supply process in each of the color image forming portions SY, SM, and SC, and to eliminate necessity of the toner supply process for executing color printing next time. Thus, according to the embodiment, it is possible to reduce the chances to extend the FPOT.

Incidentally, it is possible to combine the operation which executes the toner supply process after the completion of monochrome printing described in the embodiment with the operation which executes monochrome printing and the toner supply process in parallel as described in the embodiment 3. For example, in a case that the number of monochrome printing operations is small, the toner supply process may be executed by a method of the embodiment, additionally for an insufficient amount of the toner by a method of the embodiment 3.

So far, the present invention has been described according to the specific embodiments, however, the present invention is not limited to the embodiments described above, In the embodiments described above, the image forming apparatus has been described as using an intermediary transfer method; however, the present invention is also able to be applied to an image forming apparatus using a direct transfer method. As is well known to those skilled in the art, an image forming apparatus of a tandem type which uses the direct transfer method includes a recording material bearing member which is constituted of an endless belt, etc., instead of the intermediary transfer member in the embodiments described above. And the toner image which is formed on an image bearing member of each of image forming portions is directly transferred to recording materials which are borne on the recording material bearing member and fed, in a same way as the primary transfer in the image forming apparatus of the intermediary transfer method. In such the image forming apparatus, it is possible to obtain the same effects as in embodiments described above by applying the present invention according to the embodiments described above.

Further, in the embodiments described above, number of the image forming portions is four, however, the present invention is not limited to this mode, and it is possible to apply for an image forming apparatus which includes five or more (for example, six) image forming portions. Further, in the embodiments described above, the image forming apparatus is constituted to use the toner of four colors Y, M, C and K, however, the present invention is not limited to this mode. The image forming apparatus may be constituted to use transparent toner or metallic color toner in addition to Y, M, C and K or instead of any one of these colors. Further, in the embodiments described above, the toner image of color K is formed for monochrome printing, however, the present invention is not limited to this mode, a toner image of any single color other than color K may be formed for monochrome printing.

Further, in the embodiments described above, cases, in which the cleaning member is a plate-shaped (blade-shaped) member, are described. In this case, since the friction coefficient between the image bearing member and the cleaning member tends to increase after being left unused for a long time, the effect of the present invention is remarkable. However, the present invention is not limited to this mode, it is possible to obtain same effects as the embodiments described above by applying the present invention, in a case of having a constitution which includes a member which may contact an image bearing member and increase the friction coefficient between the member and the image bearing member after being left unused for a long time. The cleaning member may be, for example, a flexible sheet-shaped member, a brush-shaped member which is mounted in a fixed arrangement or a rotatable arrangement, a block-shaped member which is formed of sponge rubber, etc.

According to the present invention, it is possible to suppress the increase in chances that the FPOT may be extended by executing the supplying operation in the job after being left unused for a long time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-114656, filed Jul. 9, 2021, which is hereby incorporated by reference herein in its entirety.

What is claimed is:

1. An image forming apparatus comprising:

a first image forming portion provided with a first rotatable image bearing member, a first developing member configured to supply a first developer on a surface of the first image bearing member, and a first cleaning member configured to form a first contacting portion by contacting the first image bearing member and configured to clean the surface of the first image bearing member at the first contacting portion;

a second image forming portion provided with a second rotatable image bearing member, a second developing member configured to supply a second developer on a surface of the second image bearing member, and a second cleaning member configured to form a second contacting portion by contacting the second image bearing member and configured to clean the surface of the second image bearing member at the second contacting portion;

a first driving source configured to drive the first image bearing member;

a second driving source configured to drive the second image bearing member;

a transfer device configured to transfer an image formed with the first developer in the first image forming portion and an image formed with the second developer in the second image forming portion to a recording material;

a controller configured to control a first operation in which the image to be transferred to the recording material is formed only in the first image forming portion of the first and second image forming portions, a second operation in which the image to be transferred to the recording material is formed in the first image forming portion and the second image forming portion, and a supplying operation in which a lubricant is attached to the second image bearing member from the second developing member and the lubricant is supplied to the second contacting portion by rotation of the second image bearing member; and an acquiring portion configured to acquire information on a time from when the first image bearing member and the second image bearing member stop after the first operation or the second operation is terminated and until a next start instruction of the first operation or the second operation is input to the controller, wherein in a case that the time indicated by an acquired result of the acquiring portion exceeds a predetermined threshold when the start instruction of the first operation is input in a stopping state of the first image bearing member and the second image bearing member, the controller controls to execute the supplying operation during a time from when the current start instruction of the first operation is input until the next start instruction of the first operation or the second operation is input.

2. An image forming apparatus according to claim 1, wherein the controller controls to execute the supplying operation before the image, to be transferred to the recording material in the first operation to be executed by a current start instruction of the first operation, is formed on the first image bearing member.

3. An image forming apparatus according to claim 1, wherein the supplying operation is a first supplying operation, and wherein the controller controls to execute a second supplying operation in which a lubricant is attached to the first image bearing member from the first developing member and the lubricant is supplied to the first contacting portion by rotation of the first image bearing member in a period overlapping with at least a part of the first supplying operation before the image, to be transferred to the recording material in the first operation to be executed by a current start instruction of the first operation, is formed on the first image bearing member.

4. An image forming apparatus according to claim 3, wherein a driving speed of the first image bearing member during execution of the second supplying operation is lower than a driving speed of the first image bearing member when the image is formed on the first image bearing member in the first operation or the second operation.

5. An image forming apparatus according to claim 1, wherein the controller controls to execute the supplying operation in a period overlapping with at least a part of a period when the image, to be transferred to the recording material in the first operation to be executed by a current start instruction of the first operation, is formed on the first image bearing member.

6. An image forming apparatus according to claim 1, wherein the controller controls to execute the supplying operation after the image, to be transferred to the recording material in the first operation to be executed by a current start instruction of the first operation, is formed on the first image bearing member.

7. An image forming apparatus according to claim 1, wherein the controller controls a supply amount of the lubricant in the supplying operation based on the acquired result of the acquiring portion.

8. An image forming apparatus according to claim 7, wherein the controller controls the supply amount such that the supply amount in a case that the time indicated by the acquired result of the acquiring portion is a second time is larger than the supply amount in a case that the time indicated by the acquired result of the acquiring portion is a first time not longer than the second time.

9. An image forming apparatus according to claim 7, wherein the controller controls to change the supply amount by changing the number of times of supply of the lubricant from the second developing member to the second image bearing member in the supplying operation.

10. An image forming apparatus according to claim 1, further comprising an ambient information acquiring portion configured to acquire information on at least one of an ambient temperature and an ambient humidity, wherein the controller controls the supply amount in the supplying operation based on the acquired result of the ambient information acquiring portion.

11. An image forming apparatus according to claim 10, wherein the controller controls the supply amount such that the supply amount in a case that absolute moisture content indicated by the acquired result of the ambient information acquiring portion is a second value is larger than the supply amount in a case that the absolute moisture content indicated by the acquired result of the ambient information acquiring portion is a first value not greater than the second value.

12. An image forming apparatus according to claim 1, wherein a driving speed of the second image bearing member during execution of the supplying operation is lower than a driving speed of the second image bearing member when the image is formed on the second image bearing member in the second operation.

13. An image forming apparatus according to claim 1, wherein the second cleaning member includes a plate-like member contacting in a counter direction against a moving direction of the surface of the second image bearing member.

14. An image forming apparatus according to claim 1, further comprising a plurality of the second image forming portions, wherein the second driving source includes a common driving source configured to drive each of the second image bearing members of the plurality of the second image forming portions.

15. An image forming apparatus according to claim 1, wherein the lubricant includes toner or an additive of the toner.

* * * * *